(12) United States Patent
Glass

(10) Patent No.: US 10,815,978 B2
(45) Date of Patent: *Oct. 27, 2020

(54) MOBILE HYDRAULIC FRACTURING SYSTEM AND RELATED METHODS

(71) Applicant: Supreme Electrical Services, Inc., Houston, TX (US)

(72) Inventor: Cory Glass, Houston, TX (US)

(73) Assignee: Supreme Electrical Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,682

(22) Filed: Jan. 28, 2019

(65) Prior Publication Data

US 2019/0154020 A1 May 23, 2019

Related U.S. Application Data

(63) Continuation-in-part of application No. 14/590,853, filed on Jan. 6, 2015, now Pat. No. 10,227,854.

(60) Provisional application No. 61/924,169, filed on Jan. 6, 2014.

(51) Int. Cl.

| | |
|---|---|
| *F04B 17/03* | (2006.01) |
| *F04B 15/02* | (2006.01) |
| *H02P 27/06* | (2006.01) |
| *F04B 17/06* | (2006.01) |
| *E21B 43/26* | (2006.01) |
| *E21B 47/06* | (2012.01) |
| *F02C 6/00* | (2006.01) |
| *F04B 1/00* | (2020.01) |

(52) U.S. Cl.
CPC .............. *F04B 17/03* (2013.01); *F04B 15/02* (2013.01); *F04B 17/06* (2013.01); *H02P 27/06* (2013.01); *E21B 43/26* (2013.01); *E21B 47/06* (2013.01); *F02C 6/00* (2013.01); *F04B 1/00* (2013.01); *F04B 2205/09* (2013.01); *F05D 2220/764* (2013.01)

(58) Field of Classification Search
CPC .......... E21B 43/26; E21B 47/06; F04B 17/03; F04B 15/02; F04B 1/00; F04B 2205/09; H02P 27/06; F02C 6/00; F05D 2220/764
See application file for complete search history.

(56) References Cited

U.S. PATENT DOCUMENTS

| 10,227,854 B2 * | 3/2019 | Glass ................... E21B 43/267 |
| 2006/0260331 A1 * | 11/2006 | Andreychuk ........... F04B 15/08 |
| | | 62/50.2 |
| 2007/0277982 A1 * | 12/2007 | Shampine ............. E21B 43/267 |
| | | 166/308.1 |

(Continued)

*Primary Examiner* — Yong-suk (Philip) Ro
(74) *Attorney, Agent, or Firm* — Jeffrey Streets; Leela Madan

(57) ABSTRACT

Hydraulic fracturing systems and methods that are configured for enhanced mobility. The hydraulic fracturing systems and methods utilize power supply components, power generating devices, and electrically powered devices that are relatively small and lightweight, thereby making the systems they are used in more easily transportable without sacrificing system performance when delivering pressurized fracturing fluid to one or more wellbores. Due to their relatively small size, the hydraulic fracturing systems may require less maintenance and may therefore be relatively inexpensive to own and operate.

14 Claims, 21 Drawing Sheets

(56) References Cited

U.S. PATENT DOCUMENTS

| | | | | |
|---|---|---|---|---|
| 2012/0203507 A1* | 8/2012 | Thomeer | ............ | G06Q 10/06316 702/183 |
| 2013/0233542 A1* | 9/2013 | Shampine | ............. | E21B 43/267 166/279 |
| 2013/0306322 A1* | 11/2013 | Sanborn | .................. | E21B 43/26 166/308.1 |
| 2014/0096974 A1* | 4/2014 | Coli | ......................... | F04B 1/16 166/358 |
| 2014/0138079 A1* | 5/2014 | Broussard | ............... | E21B 43/26 166/66.4 |
| 2015/0159465 A1* | 6/2015 | Lecerf | ................... | E21B 33/13 166/285 |

\* cited by examiner

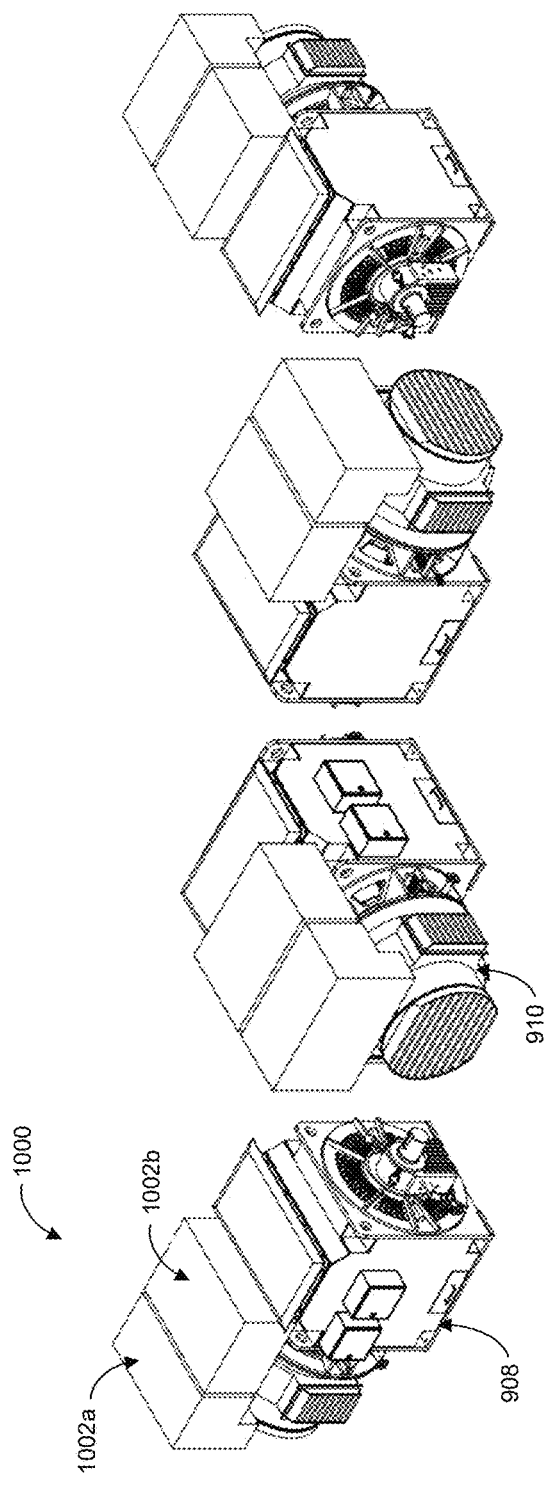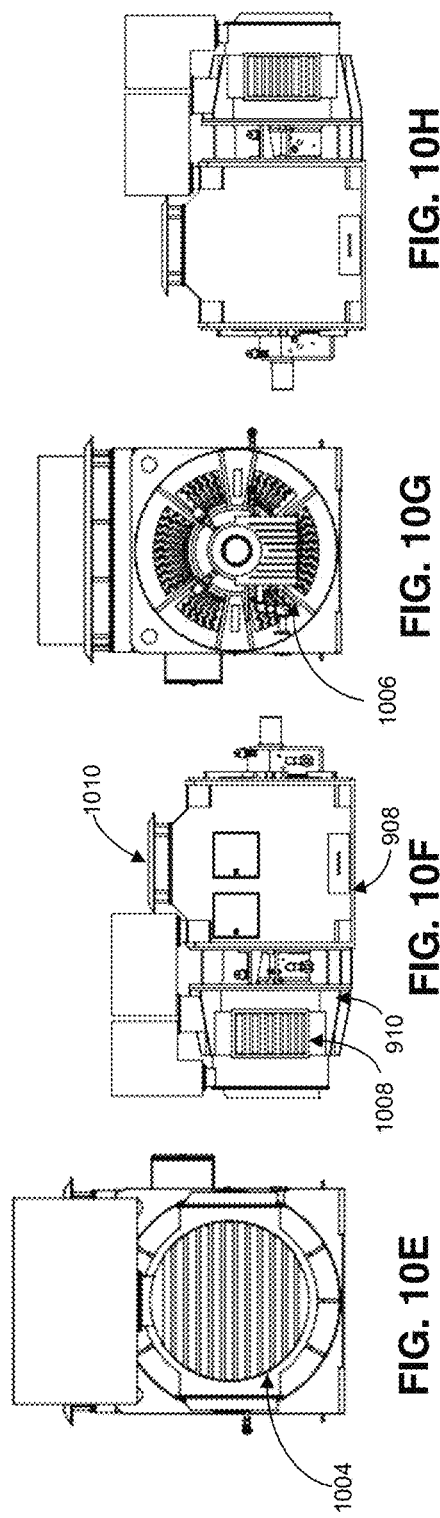

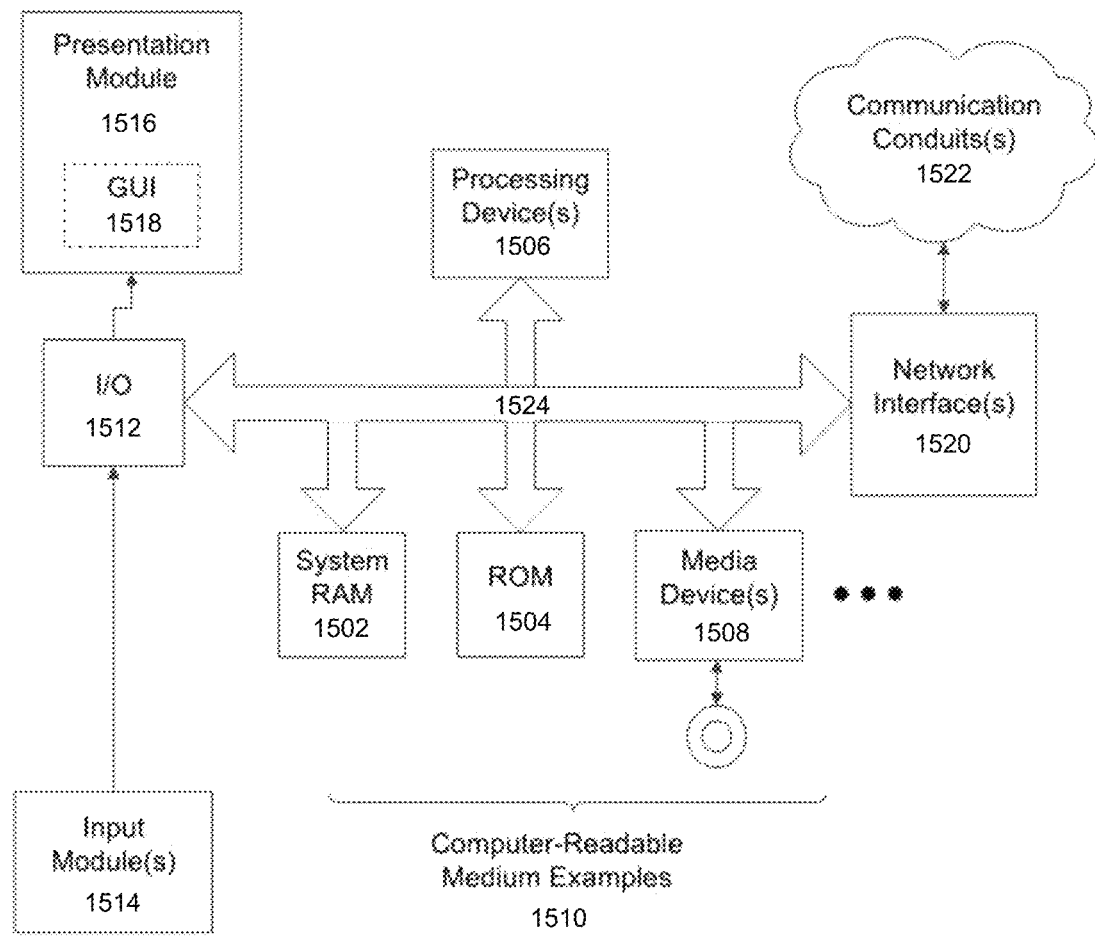
FIG. 15

MOBILE HYDRAULIC FRACTURING SYSTEM AND RELATED METHODS

CROSS-REFERENCE TO RELATED APPLICATION

The present Application is a Continuation-in-Part of U.S. patent application Ser. No. 14/590,853, entitled "Hydraulic fracturing system," by Lime Instruments LLC, filed on Jan. 6, 2015, which claims benefit under 35 U.S.C. § 119(e) to U.S. Provisional Application No. 61/924,169, filed Jan. 6, 2014, both of which are incorporated by reference herein in their entirety.

FIELD OF THE DISCLOSURE

The present disclosure generally relates to hydraulic fracturing systems and more particularly to hydraulic fracturing systems that comprise an at least partially mobile configuration.

BACKGROUND

The statements in this section merely provide background information related to the present disclosure and may not constitute prior art.

Hydraulic fracturing is the fracturing of rock by a pressurized liquid. Some hydraulic fractures form naturally; certain veins or dikes are examples. Induced hydraulic or hydrofracturing is a technique in which typically water is mixed with sand and chemicals, and the mixture is injected at high pressure into a wellbore to create fractures, which form conduits along which fluids such as gas, petroleum, and groundwater may migrate to the well. The technique is very common in wells for shale gas, tight gas, tight oil, and coal seam gas.

A hydraulic fracture is formed by pumping the fracturing fluid into the wellbore at a rate sufficient to increase pressure downhole to exceed that of the fracture gradient of the rock. The fracture gradient is defined as the pressure increase per unit of the depth due to its density and it is usually measured in pounds per square inch per foot or bars per meter. The rock cracks and the fracture fluid continues further into the rock, extending the crack still further, and so on. Operators typically try to maintain "fracture width", or slow its decline, following treatment by introducing into the injected fluid a proppant—a material such as grains of sand, ceramic, or other particulates that prevents the fractures from closing when the injection is stopped and the pressure of the fluid is reduced. Consideration of proppant strengths and prevention of proppant failure become more important at greater depths where pressure and stresses on fractures are higher. The propped fracture is permeable enough to allow the flow of formation fluids to the well. Formation fluids include gas, oil, salt water, fresh water, and fluids introduced to the formation during completion of the well during fracturing.

Fracturing is typically performed by large diesel powered pumps. Such pumps are able to pump fracturing fluid into a wellbore at a high enough pressure to crack the formation, but they also have drawbacks. For example, diesel pumps are very heavy, and thus must be moved on heavy duty trailers, making transporting the pumps between oilfields expensive and inefficient. In addition, the diesel engines required to drive the pumps require a relatively high level of maintenance.

Given the foregoing, what is needed are hydraulic fracturing systems and methods that comprise an enhanced mobility and require less maintenance.

SUMMARY

This Summary is provided to introduce a selection of concepts. These concepts are further described below in the Detailed Description section. This summary is not intended to identify key features or essential features of this disclosure's subject matter, nor is this Summary intended as an aid in determining the scope of the disclosed subject matter.

Aspects of the present disclosure meet the above-identified needs by providing hydraulic fracturing systems and methods that are more lightweight, take up less space, and require less maintenance than currently available systems. Hydraulic fracturing systems in accordance with the present disclosure comprise equipment that may be mounted on or within a trailer, skid, frame, container, or similar frame mounted unit and delivered to a well site via at least one mobile unit, such as a tractor or other appropriate vehicle(s) or means. Some of the equipment may include one or more pressure delivering devices, such as pumping mechanism(s), which may be at least partially powered by one or more power sources, such as one or more turbines and/or generators, permanently or removably secured upon or within the frame mounted unit(s) and controlled by associated electronics.

In some nonlimiting exemplary embodiments, hydraulic fracturing systems in accordance with the present disclosure may include at least one power supply apparatus that comprises at least one turbine such as, by way of example and not limitation, a twin-engine dual fuel (gas or diesel) turbine, configured to utilize a single shaft to drive multiple power generating devices. By way of example and not limitation, the power generating devices may include a 0.6 megawatt 480 volt three phase generator operating at approximately 60 Hertz as well as two 2.05 megawatt 2100 volt three phase generators, each operating at approximately 270 Hertz. In some aspects, a single 4.1 megawatt 2100 volt three phase generator operating at approximately 270 Hertz may take the place of the two 2.05 megawatt generators.

Hydraulic fracturing systems in accordance with the present disclosure may further include at least one motor control breaker, or switchgear, in the form of a utility grade recloser for circuit protection. The switchgear may include the ability to monitor and/or control the power quality of each power generating device or all power generating devices in combination in substantially real time, including the monitoring and/or controlling of the voltage, electric current, and/or electrical signal being output by each and/or all power generating device(s). The switchgear may include a drive system that is mounted to a hydraulic fracturing system in accordance with the present disclosure and that utilizes a multi-pulse rectifier bridge instead of the more traditional step-down transformer.

The power supply apparatus used with the disclosed hydraulic fracturing systems may be used to at least partially facilitate the operation of one or more electrically powered devices. By way of example and not limitation, an individual electrically powered device may take the form an induction motor with a horsepower of approximately 2,550 and an operating voltage of about 3,900 volts. Each electrically powered device may be relatively lightweight, with a weight ranging from about 8,000 pounds to 1,300 pounds. The electrically powered device(s) may be cooled via at least one cooling medium, such as liquid, air, or gas, or a combination thereof. In some aspects, the electrically powered device(s) may be forced air cooled by one or more blower devices, such as, by way of example and not limitation, two fifteen horsepower blowers. The electrically powered device(s) may be coupled to and/or configured to engage in electrical communication with the power supply apparatus and one or more variable-frequency drives (VFDs) via one or more cables, in-line connectors, and/or similar elements or components.

In some aspects, each electrically powered device may be permanently or removably attached or mounted upon or within at least one portion of at least one frame mounted unit, such as a skid, trailer, or container. In some additional aspects, the frame mounted unit may further include a lubricant cooling system as well as a lubricant tank.

In some nonlimiting exemplary embodiments, the electrically powered device(s) of the hydraulic fracturing systems of the present disclosure may be configured to at least partially facilitate the functioning of one or more pressure delivering devices, such as one or more well service pumps or similar pumping mechanisms.

In one embodiment, a method of delivering fracturing fluid to a wellbore is disclosed, the method including providing to a wellbore site at least one frame mounted unit configured to be transportable from at least one first location to at least one second location, the at least one frame mounted unit including: at least one power supply apparatus and/or power source; one or more electrically powered devices; one or more pressure delivering devices coupled to the electrically powered devices via one or more mechanical couplings, such as, by way of example and not limitation, one or more belts, pulley assemblies, gear couplings, and/or transmissions; one or more variable-frequency drives (VFDs) coupled to and/or configured to engage in electrical communication with the power supply and the electrically powered device(s) via one or more cables, in-line connectors, and/or similar elements or components; and operating components to facilitate the pumping of the fracturing fluid from the surface to the wellbore.

In a related aspect, the at least one frame mounted unit may include at least one power supply apparatus that comprises a twin-engine dual fuel (gas or diesel) turbine configured to utilize a single shaft to drive multiple power generating devices, at least one 0.6 megawatt 480 volt three phase generator operating at approximately 60 Hertz, two or more 2.05 megawatt 2100 volt three phase generators, each operating at approximately 270 Hertz, at least one switchgear in the form of a utility grade recloser, two or more 2,550 horsepower (HP) induction motors with an operating voltage of approximately 3,900 volts, two or more fifteen HP blowers, and at least one variable-frequency drive.

In another related aspect, the at least one frame mounted unit may include at least one power supply apparatus that comprises a twin-engine dual fuel (gas or diesel) turbine configured utilize a single shaft to drive multiple power generating devices, at least one 0.6 megawatt 480 volt three phase generator operating at approximately 60 Hertz, at least one 4.1 megawatt 2100 volt three phase generator operating at approximately 270 Hertz, at least one switchgear, two or more 2,550 HP induction motors with an operating voltage of approximately 3,900 volts, two or more fifteen HP blowers, and at least one variable-frequency drive.

In some nonlimiting exemplary embodiments, hydraulic fracturing systems in accordance with the present disclosure may comprise at least one mobile unit in the form of a tractor having multiple axles; at least one frame mounted unit in the form of a trailer, the trailer including: one or more pressure delivering devices in the form of well service pumps; one or more electrically powered devices in the form of electric induction motors with cooling fans, the electric induction motors being coupled to the well service pumps via one or more mechanical couplings, such as belts, pulley assemblies, gear couplings, and/or transmissions; one or more variable-frequency drives (VFD) with a cooling system, the one or more variable-frequency drives being coupled to and/or configured to engage in electrical communication with the induction motors via one or more cables, in-line connectors, and/or similar elements or components; a power source in the form of a diesel generator coupled to the motors and VFD via one or more cables, in-line connectors, and/or similar elements or components; and optionally a cooling radiator coupled to the diesel motor.

In some aspects, each of the one or more well service pumps may be capable of supplying at least 3,500 HP. In another aspect, each of the one or more electric induction motors may be capable of supplying at least 2,000 HP.

In some aspects, the combined weight of a single tractor and trailer may be less than 127,600 pounds. In some further aspects, the one or more electric induction motors or other electrically powered devices may be mounted upon the one or more well service pumps or other pressure delivering devices.

In some aspects, each well service pump may comprise a quintuplex plunger-style fluid pump. In some additional aspects, each well service pump may comprise a triplex plunger-style fluid pump.

In some further aspects, the at least one trailer may include two well service pumps or other pressure delivering devices and each well service pump may be coupled to two induction motors or other electrically powered devices. In a related aspect, the at least one trailer may include two quintuplex plunger-style fluid pumps, each capable of supplying at least 3,000 HP; two alternating current (AC) induction motors mounted on each fluid pump, each capable of supplying at least 1,600 HP; two 4,000 horsepower AC VFDs; a VFD cooling system; and, in some aspects, an auxiliary power source in the form of a diesel generator, wherein the auxiliary diesel generator may power one or more pieces of auxiliary equipment, one or more lube pumps, and/or one or more cooling fans, and where the induction motors and fluid pumps may be mechanically coupled via pulley assemblies.

In some aspects, the at least one trailer or other frame mounted unit may include one well service pump or other pressure delivering device coupled to one induction motor or other electrically powered device. In some related aspects, the at least one trailer may include one quintuplex plunger-style fluid pump capable of supplying at least 3,500 horsepower, an AC induction motor capable of supplying at least 2,000 horsepower, a 4,000 horsepower AC VFD, and an auxiliary power source in the form of a diesel generator, wherein the auxiliary diesel generator may power one or more pieces of auxiliary equipment, one or more lube pumps, and/or one or more cooling fans, and wherein the induction motor and fluid pump may be mechanically coupled via transmission.

In some aspects, the functionality of each electrically powered device function, such as, for example and not limitation, the functionality of each electric induction motor or other electrically powered device may be diagnosed via a separate operator interface terminal. In another aspect, the pressure delivering devices, such as, for example and not limitation, well service pumps and electrically powered devices, such as, for example and not limitation, electric induction motors may be horizontally configured. In some further aspects, the hydraulic fracturing systems of the present disclosure may be configured to be disposed at one or more on shore or offshore sites.

In some additional nonlimiting exemplary embodiments, hydraulic fracturing systems in accordance with the present disclosure may comprise, optionally, at least one mobile unit in the form of a tractor having multiple axles; at least one frame mounted unit in the form of a trailer having multiple axles releasably coupled with the at least one tractor, the at least one trailer including: one or more pressure delivering devices in the form of one or more well service pumps, where the service pumps may comprise quintuplex or triplex plunger-style fluid pumps; one or more electrically powered devices in the form of one or more electric induction motors with cooling fans, the one or more electric induction motors being coupled to the well service pumps via one or more mechanical couplings such as belts, pulley assemblies, gear couplings, and/or transmissions; one or more variable-frequency drives (VFDs) with a cooling system, the one or more variable-frequency drives being coupled to and/or configured to engage in electrical communication with the induction motors via one or more cables, in-line connectors, and/or similar elements or components; and a power source in the form of a diesel generator coupled to the induction motors and VFD via one or more cables, in-line connectors, and/or similar elements or components.

In some related aspects, the at least one trailer may include two quintuplex plunger-style fluid pumps, each capable of supplying at least 3,000 horsepower; two AC induction motors mounted on each fluid pump, each capable of supplying at least 1,600 horsepower; two 4,000 horsepower AC VFDs; a VFD cooling system; and optionally an auxiliary power source in the form of a diesel generator, wherein the auxiliary diesel generator may power one or more pieces of auxiliary equipment, one or more lube pumps, and/or one or more cooling fans, and where the induction motors and fluid pumps are mechanically coupled via pulley assemblies.

In some additional related aspects, the at least one trailer may include one quintuplex plunger-style fluid pump capable of supplying at least 3,500 horsepower, an AC induction motor capable of supplying at least 2,000 horsepower, a 4,000 horsepower AC VFD, and an auxiliary power source in the form of a diesel generator, wherein the auxiliary diesel generator may power one or more pieces of auxiliary equipment, one or more lube pumps, and/or one or more cooling fans, and where the induction motor and fluid pump are mechanically coupled via transmission.

In some further nonlimiting exemplary embodiments, hydraulic fracturing systems in accordance with the present disclosure may comprise, optionally, at least one mobile unit in the form of a tractor having multiple axles; at least one frame mounted unit in the form of a trailer, the at least one trailer including: one or more pressure delivering devices in the form of one or more well service pumps; one or more electrically powered devices in the form of one or more horizontal electric induction motors, the one or more electric induction motors being coupled to the well service pumps via one or more mechanical couplings such as belts, pulley assemblies, gear couplings, and/or transmissions; one or more variable-frequency drives (VFDs) with a cooling system, the one or more variable-frequency drives being coupled to and/or configured to engage in electrical communication with the electric induction motors via one or more cables, in-line connectors, and/or similar elements or components; a power source in the form of a diesel generator coupled to the motors and VFD via one or more cables, in-line connectors, and/or similar elements or components; and optionally a cooling radiator coupled to the diesel motor.

In some related aspects, the at least one trailer may include two triplex plunger-style fluid pumps; two AC induction motors mounted on each fluid pump, each capable of supplying at least 1,600 horsepower; two 4,000 horsepower AC VFDs; a VFD cooling system; and optionally an auxiliary power source in the form of a diesel generator, wherein the auxiliary diesel generator may power one or more pieces of auxiliary equipment, one or more lube pumps, and/or one or more cooling fans, and where the induction motor and fluid pump may be mechanically coupled via pulley assemblies.

In some further related aspects, the at least one trailer may include one 3,500 horsepower quintuplex plunger-style fluid pump, an AC induction motor capable of supplying at least 2,000 horsepower, a 4,000 horsepower AC VFD drive, and an auxiliary power source in the form of a diesel generator, wherein the auxiliary diesel generator may power one or more pieces of auxiliary equipment, one or more lube pumps, and/or one or more cooling fans, and wherein said induction motor and fluid pump are mechanically coupled via transmission.

In some still further related aspects, the trailer may comprise a 46 foot step deck trailer or a 40 foot step deck trailer.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIGS. 10A-10H are various views of an exemplary power generation unit for a hydraulic fracturing system that is configured for enhanced mobility, according to one or more aspects of the present disclosure.

FIG. 15 is a block diagram of an exemplary computing system useful for implementing one or more aspects of the present disclosure.

DETAILED DESCRIPTION

Figure 1:
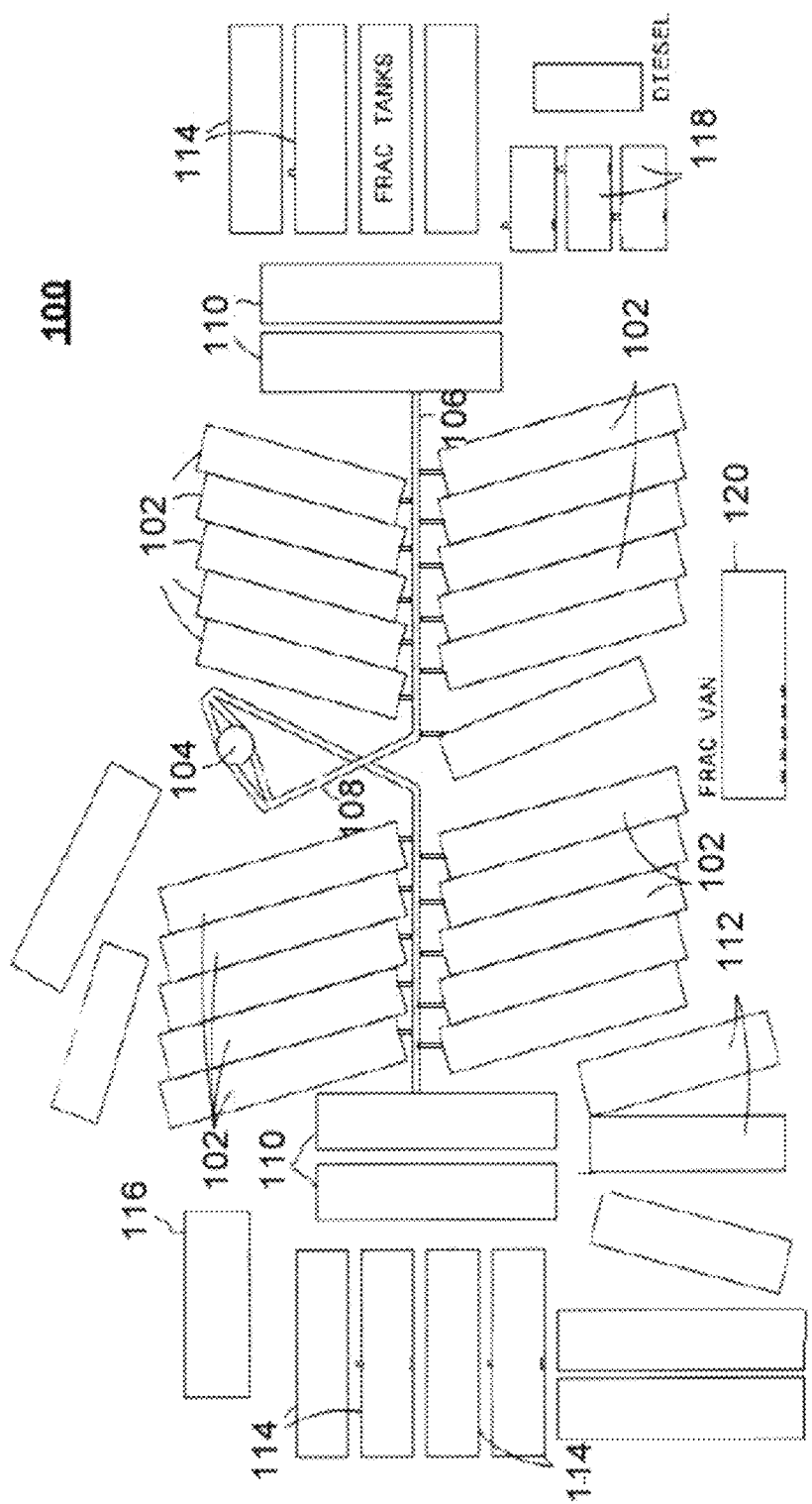
FIG. 1 is one exemplary embodiment of a plan view showing a fracturing site and exemplary fracturing equipment used at the site, according to one or more aspects of the present disclosure.

Generally, the technique of hydraulic fracturing is used to increase or restore the rate at which fluids, such as, for example and not limitation, petroleum, water, or natural gas, can be recovered from subterranean reservoirs. Reservoirs are typically porous sandstones, limestones, or dolomite rocks, but also may include "unconventional reservoirs" such as shale rock or coal beds. Hydraulic fracturing enables the production of natural gas, oil, and the like from rock formations below the Earth's surface, where there may not be sufficient permeability or reservoir pressure to allow natural gas, oil, etc. to flow from the rock into the wellbore at economic rates. Thus, creating conductive fractures in the rock may facilitate the extraction of gas from shale reservoirs, which have an extremely low natural permeability. Fractures provide a conductive path that connects a larger volume of the reservoir to the well.

During a hydraulic fracturing process, high-pressure fracture fluid is injected into a wellbore, wherein the pressure of the fracture fluid is greater than the fracture gradient of the rock. The fracturing fluid may create fractures and/or extend existing fractures as well as carry proppant into the created/existing fractures, the proppant being used to remain within the fractures without damaging them or hindering the production of the well.

Fluids blended with proppant are pumped under high pressure into the well, fracturing the surrounding formation. The proppant material will keep an induced hydraulic fracture open, during or following a fracturing treatment. The proppant material may hold the fractures within the formation open to increase the rate of gas or oil recovery. The fracturing fluid typically comprises water; however, one or more polymers or other additives may be added to the water to, among other things, decrease friction loss as the water is pumped down a well. Water containing the polymer is usually called "slick water." Other polymers may be used during a fracturing treatment to form a more viscous fluid. Proppant is added to the fracturing fluid so that fractures do not close, even after pumping stops.

Fluids are selected and/or formulated for fracturing based on various material properties such as, by way of example and not limitation, viscosity, where more viscous fluids can carry more concentrated proppant; the energy or pressure needed to maintain a certain flux pump rate (flow velocity) that will conduct the proppant appropriately; pH; and various rheological factors, among others. Types of proppant may include, by way of example and not limitation, silica sand, resin-coated sand, and man-made ceramics. The type of proppant used may vary depending on the type of permeability or grain strength needed. The most commonly used proppant is silica sand, although proppants of uniform size and shape, such as a ceramic proppant, are generally thought to be more effective. By selecting proppant(s) to establish a higher porosity within the fracture(s), a greater amount of oil and/or natural gas may be liberated and recovered.

The fracturing fluid may vary in composition depending on the type of fracturing being used, the conditions of the specific well being fractured, and the characteristics of the available water. A typical fracture treatment uses between 3 and 12 additive chemicals. Although there may be unconventional fracturing fluids, the more typically used chemical additives may include one or more of the following:

acids—hydrochloric acid (usually 28%-5%), or acetic acid is used in the pre-fracturing stage for cleaning the perforations and initiating fissures in the near-wellbore rock;

sodium chloride (salt)—delays breakdown of the gel polymer chains;

polyacrylamide and other friction reducers—reduces the friction between the fluid and pipe(s), thereby allowing the pumps to pump at a higher rate without having greater pressure on the surface;

ethylene glycol—decreases the formation of scale deposits in the pipe(s);

borate salts—used for maintaining fluid viscosity during temperature increases;

sodium and potassium carbonates—used for maintaining the effectiveness of crosslinkers;

glutaraldehyde—used as disinfectant for the water (bacteria elimination);

guar gum and other water-soluble gelling agents—increases the viscosity of the fracturing fluid to deliver the proppant into the formation more efficiently;

citric acid—used for corrosion reduction; and/or isopropanol—increases the viscosity of the fracturing fluid.

Hydraulic fracturing equipment used in oil and natural gas fields may include at least one blending apparatus in the form of a slurry blender, one or more pressure delivering devices in the form of high-pressure, high-volume fracturing pumps (typically powerful triplex or quintuplex pumps) and at least one monitoring unit. Associated equipment may include fracturing (frack) tanks, one or more units for the storage and/or handling of proppant, high-pressure treating iron, at least one chemical additive unit (used to accurately monitor chemical addition), one or more low-pressure flexible hoses, and many gauges and meters to measure flow rate, fluid density, and/or treating pressure.

The present disclosure is directed to hydraulic fracturing systems and methods that have a higher degree of mobility and occupy less physical space than existing hydraulic fracturing systems. In some aspects, the hydraulic fracturing systems and methods of the present disclosure may function with smaller and lighter power supply components, thereby making the entire systems smaller and lighter than other systems, which enables the hydraulic fracturing systems of the present disclosure to be more easily transported, have lower transportation costs, require less maintenance, and have lower maintenance costs than existing systems. Specifically, in an aspect, hydraulic fracturing systems and methods are disclosed that utilize at least one power supply apparatus that comprises one or more turbines, each turbine utilizing a single shaft to drive one or more power generation devices in order to generate power that may be delivered in the form of alternating current (AC) and/or direct current (DC) electricity to one or more relatively compact and/or lightweight electrically powered devices.

In some aspects, the hydraulic fracturing systems and methods of the present disclosure may further comprise at least one switchgear or motor control breaker in the form of a utility grade recloser. Such switchgear may include the ability to monitor the power quality, including the voltage, electric current, and/or electrical signal being output by one or more power generating devices used with the hydraulic fracturing systems of the present disclosure in substantially real time, thereby facilitating the ability of a user and/or computing device to monitor the performance of the power generating device(s) and/or observe and address any perceived issues quickly and efficiently.

In some further aspects, the hydraulic fracturing systems of the present disclosure may be advantageous by, among other things, being able to use pumps containing prime movers that produce horsepower greater 2,250 and still fit a standard trailer (see, cf., U.S. Publication No. 2008/0029267, herein incorporated by reference in its entirety).

In some nonlimiting exemplary embodiments, each pump or other pressure delivering device used by the hydraulic fracturing systems of the present disclosure may be rated for about 2,500 horsepower or more. In addition, the components of the hydraulic fracturing systems of the present disclosure, including the pumps and electrically powered devices, such as induction motors, may be capable of operating during prolonged pumping operations, and at temperatures in the range of about 0° C. or lower to about 55° C. or greater. In some additional aspects, each electrically powered motor may be coupled with one or more variable-frequency drive(s) (VFD), and an AC console that may control the speed of each electric motor, and hence the speed of the pump associated with each motor. In some related aspects, the functionality of each electric induction motor or other electrically powered device may be diagnosed via a separate operator interface terminal, using software specifically designed for such diagnosis.

The VFDs of the present disclosure may be discrete to each frame mounted unit and/or pressure delivering device (e.g., pump). Such a feature may be advantageous because it allows for independent control of the pumps and motors. Thus, if one pump goes offline, the remaining pumps and motors on the frame mounted unit or in the fleet of frame mounted units may continue to function, thereby adding redundancy and flexibility to the system. In addition, separate control of each pump/motor by an operator makes the system more scalable, because individual pumps/motors can be added or removed from a site without modification of the VFD.

The terms "power supply" and "power source" and/or the plural form of these terms are used throughout herein to refer to any machine, device, mechanism, apparatus, component, and/or system that may be a source of mechanical and/or electric power to one or more power recipients, such power supply/power source including turbines, generators, other power generating devices, and the like.

The term "power recipient" and/or the plural form of this term are used throughout herein to refer to any machine, device, mechanism, apparatus, component, and/or system that may receive an amount of mechanical and/or electric power from at least one power supply or power source, including electrically powered devices, such as induction motors, and the like.

The term "pressure delivering device" and/or the plural form of this term are used throughout herein to refer to any machine, device, mechanism, apparatus, component, and/or system that may be configured to pump at least one fluid in a pressurized state, including pumping mechanisms such as well service pumps, which may include triplex plunger-style fluid pumps, quintuplex plunger-style fluid pumps, and the like.

The term "electrically powered device" and/or the plural form of this term are used throughout herein to refer to any machine, device, mechanism, apparatus, component, and/or system that may utilize an amount of mechanical and/or electric power to function, including induction motors and the like.

The term "frame mounted unit" and/or the plural form of this term are used throughout herein to refer to any frame based apparatus, formation, and/or medium configured to be moved via human effort and/or via an amount of mechanical and/or electric power and upon which one or more components, machines, devices, mechanisms, apparatuses, and/or systems may be removably or permanently mounted and/or enclosed, including skids, trailers, frames, containers, and the like.

The term "mobile unit" and/or the plural form of this term are used throughout herein to refer to any vehicle powered by any appropriate means (e.g., internal combustion engine, electric motor, etc.) and that may be configured to facilitate the transportation of at least one frame mounted unit, including tractors, trucks, ships, boats, cars, aircraft, automobiles, and the like.

The term "footprint" and/or the plural form of this term are used throughout herein to refer to the on-site area required to accommodate a fracturing system, such as a wellsite, trailer, vessel deck, and the like.

The term "real time" and/or the plural form of this term are used throughout herein to refer to the actual time during which a process takes place or an event occurs.

Referring now to FIG. 1, a plan view of one exemplary embodiment of exemplary fracturing equipment of the present disclosure used in a fracturing site 100, according to one or more aspects of the present disclosure, is shown.

The formation of a fracture requires the injection of hundreds of thousands of gallons of fluid under high pressure supplied by pressure delivery devices 1106 in the form of pumps 102, which may be mounted on one or more frame mounted units in the form of trailers. The trailers may remain at the well site throughout the fracturing treatment of a well 104. At least one manifold apparatus 106 may connect pumps 102 to at least one flow line 108, which in turn may be connected to well 104. Fluid and additives may be blended in at least one blending apparatus 110 and taken by manifold 106 to the intake or suction of pumps 102 and then pumped at high pressure to well 104. One or more proppant storage vessels 112 and liquid storage vessels 114 may be used for maintaining a supply of materials during a treatment. Quality control tests of the fluid and additives may be performed within structure 116 before and during well treatments. Fuel for prime movers of the pumps may be stored in tanks 118. The site may also include at least one control vehicle 120 for one or more operators.

Pump control and data monitoring equipment may be mounted on or within control vehicle 120, which may be connected to the pumps, motors, and other equipment to provide information to one or more operators, and allow the operator(s) to control different parameters of the fracturing operation.

Some advantages of the hydraulic fracturing system of the present disclosure may include, by way of example and not limitation:

1) Having the motors and pumps be integrated with the trailer.

2) Having AC induction motors on the trailer power the pumps.

3) Being able to be power the system via a 4160 volt 3 phrase AC power source at the fracturing site.

4) Having one or more diesel generators mounted on the trailer that may be used as a power source for the induction motors. Diesel generators mounted on the unit may be used as an auxiliary power source which may supply power to small 480V AC motors such as lube pumps, cooling fans, and/or lights when the unit is not connected to a main power source.

5) The trailer is self-contained and can function independently of other trailers or equipment at the site.

6) Having a variable-frequency drive (VFD) and associated cooling system that is mounted on each trailer (including a motor control center or MCC).

7) Having a physical footprint that is smaller compared to similar systems necessary to produce the same horsepower.

In some nonlimiting exemplary embodiments, each pump 102 may have a maximum rating of 3,000 horsepower (HP). A conventional diesel powered fluid pump 102 is rated for 2,250 horsepower. However, due to parasitic losses in the transmission, torque converter, and cooling systems, diesel fueled systems typically only provide 1,800 HP to the pumps. In contrast, hydraulic fracturing systems in accordance with the present disclosure may be capable of delivering at least 2,500 HP (or greater) directly to each pump 102 because each pump 102 may be directly mechanically coupled to one or more electrically powered devices in the form of electric motors. Further, the nominal weight of a conventional pump is up to 120,000 pounds. However, in the hydraulic fracturing systems of the present disclosure, each pump 102 and electric motor combination may only weigh about 37,000 pounds, thereby allowing for the placement of about 2 pumps 102 in the same physical dimension (size and weight) as would be needed for a single pump in conventional diesel systems, as well as allowing for up to 10,000 HP total (or more) to be provided to pumps 102. In some additional nonlimiting exemplary embodiments, more or fewer units may be located in a smaller footprint, to give the same or more power relative to conventional systems.

In some aspects, a fracturing unit in accordance with the present disclosure may include one or more electric motors capable of operating in the range of up to 2,800 revolutions per minute (RPM). A fracturing unit may also include one or more pumps 102 that are plunger-style fluid pumps that may be mechanically coupled to the one or more electric motors, such as, by way of example and not limitation, via one or more belts, pulley assemblies, and/or gear couplings. In some additional aspects, the trailer containing a hydraulic fracturing system in accordance with the present disclosure may have dimensions of approximately 8.5' width×48' length×9.2' height, and component weight up to approximately 110,000 pounds. These dimensions may allow the fracturing system as disclosed to be easily transported by conventional tractor-trailer systems or one or more other mobile units.

In some aspects, hydraulic fracturing systems in accordance with the present disclosure may be self-contained in that the motors may be powered by a diesel generator mounted on the same trailer, including that in some additional nonlimiting exemplary embodiments, hydraulic fracturing systems in accordance with the present disclosure may have an additional auxiliary power source in the form of, for example and not limitation, a diesel generator, which may power auxiliary equipment, lube pumps, and/or cooling fans, as well as any similar devices, mechanisms, or components as may be apparent to those skilled in the relevant art(s) after reading the description herein.

Figure 2:
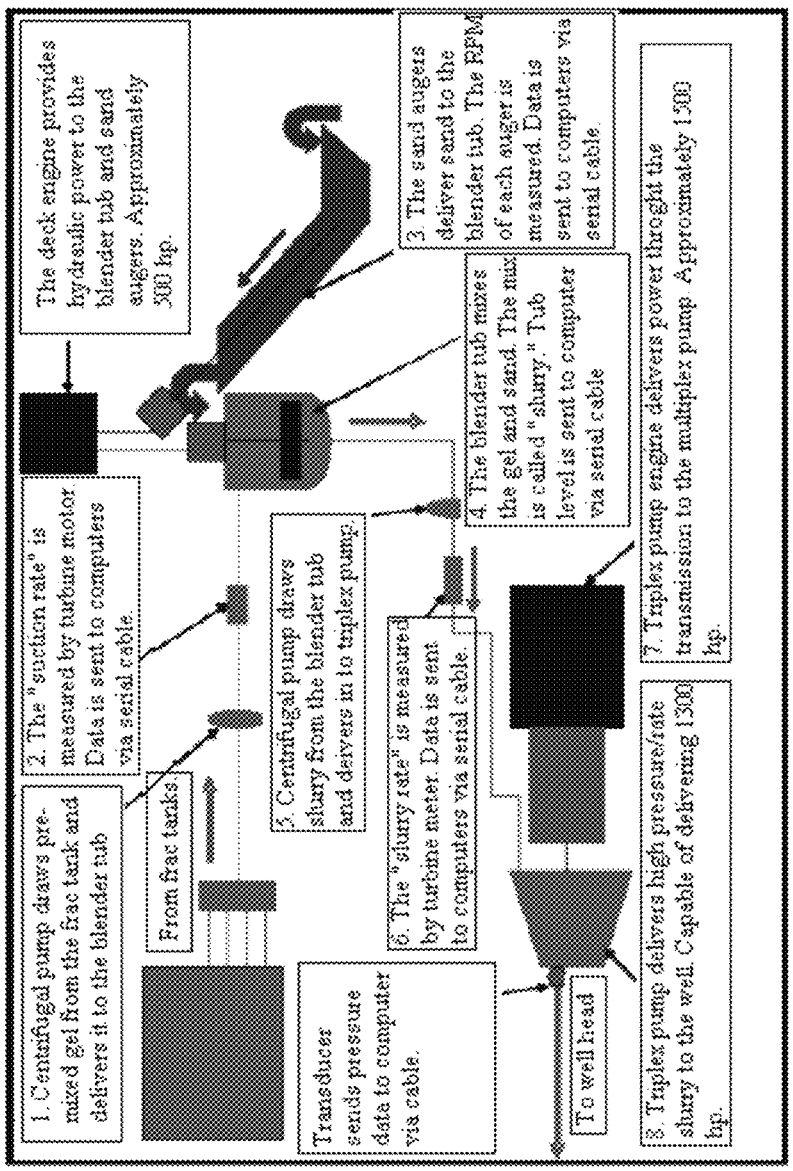
FIG. 2 is a diagram schematically showing one exemplary embodiment of how the exemplary equipment of FIG. 1 may function with other exemplary equipment at the fracturing site, according to one or more aspects of the present disclosure.

Referring now to FIG. 2, a diagram showing schematically one exemplary embodiment 200 of how the exemplary equipment of the present disclosure may function together, according to one or more aspects of the present disclosure, is shown. The functional steps may include, by way of example and not limitation:

1. At least one centrifugal pump draws pre mixed gel from the frack tank and delivers it to the blender tub of at least one blending apparatus 110 (not shown in FIG. 2).

2. The pre mixed gel "suction rate" is measured by one or more magnetic and/or turbine flow meters. Data is sent to one or more computers.

3. One or more sand augers deliver sand to the blender tub of blending apparatus(es) 110. The RPM of each auger is measured. Data is sent to one or more computers.

4. The blender tub mixes the gel and sand. The mix is called "slurry." Tub level information is sent to one or more computers.

5. At least one centrifugal pump draws slurry from the blender tub and delivers it to at least one triplex pump (or other pressure delivering device).

6. The "slurry rate" is measured by one or more magnetic and/or turbine flow meters. Data is sent to computers.

7. At least one triplex (or quintuplex) pump engine delivers approximately 1,500 HP of power, through the transmission, to the at least one triplex pump (or other pressure delivering device).

8. The at least one triplex (or quintuplex) pump (or other pressure delivering device) delivers high-pressure/rate slurry to the well. In some nonlimiting exemplary embodiments, the at least one triplex (or quintuplex) pump (or other pressure delivering device) may be capable of delivering approximately at least 1,300 to 3,500 HP.

Measuring the pressure and rate during the development of a hydraulic fracture, as well as knowing the properties of the fluid and proppant being injected into the well, provides the most common and simplest method of monitoring a hydraulic fracturing treatment. This data, along with knowledge of the underground geology, may be used to model information such as, by way of example and not limitation, the length, width and conductivity of a propped fracture.

Figure 3A:
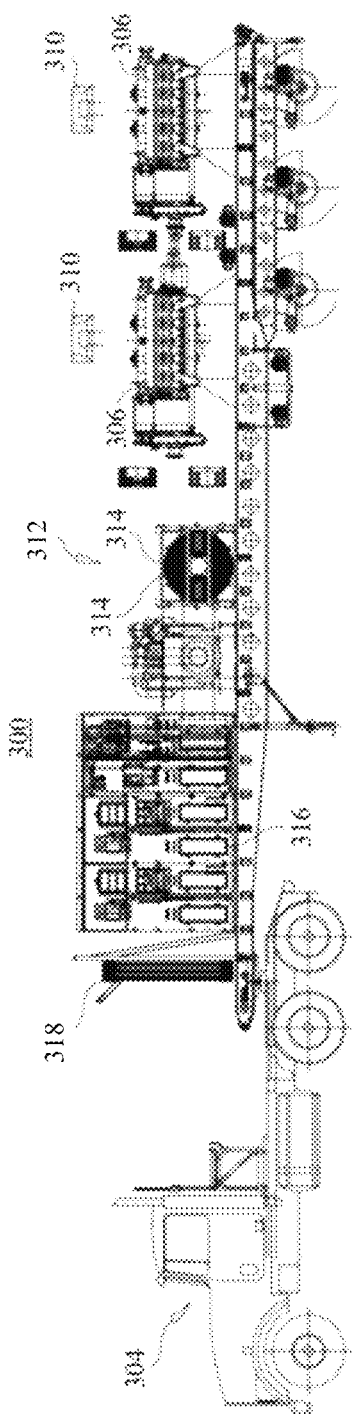
FIG. 3A is a side view of a first exemplary three axle hydraulic fracturing trailer connected to an exemplary three axle tractor, according to one or more aspects of the present disclosure.
Figure 3B:
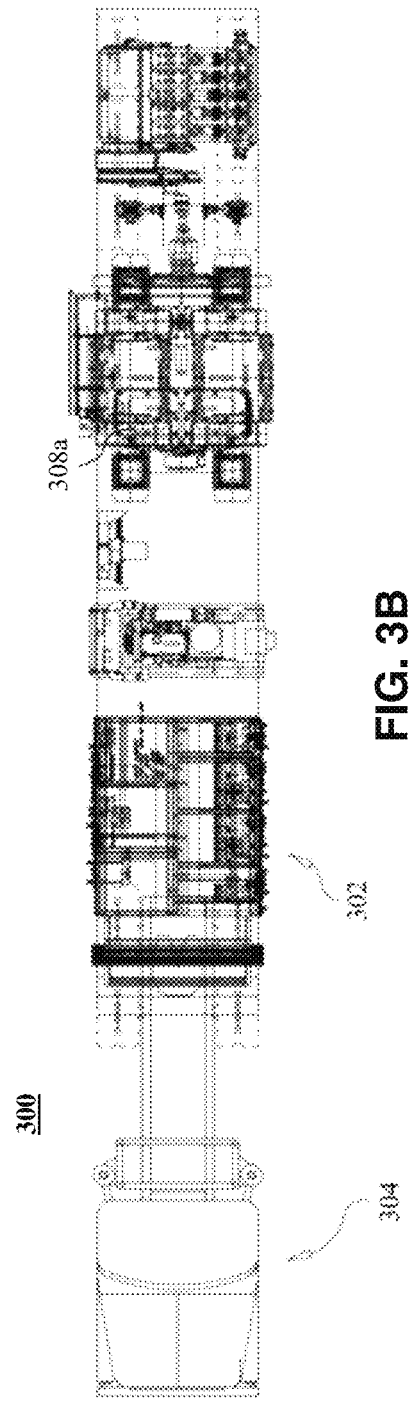
FIG. 3B is a top view of the first exemplary three axle hydraulic fracturing trailer and exemplary three axle tractor of FIG. 3A, according to one or more aspects of the present disclosure.
Figure 3C:
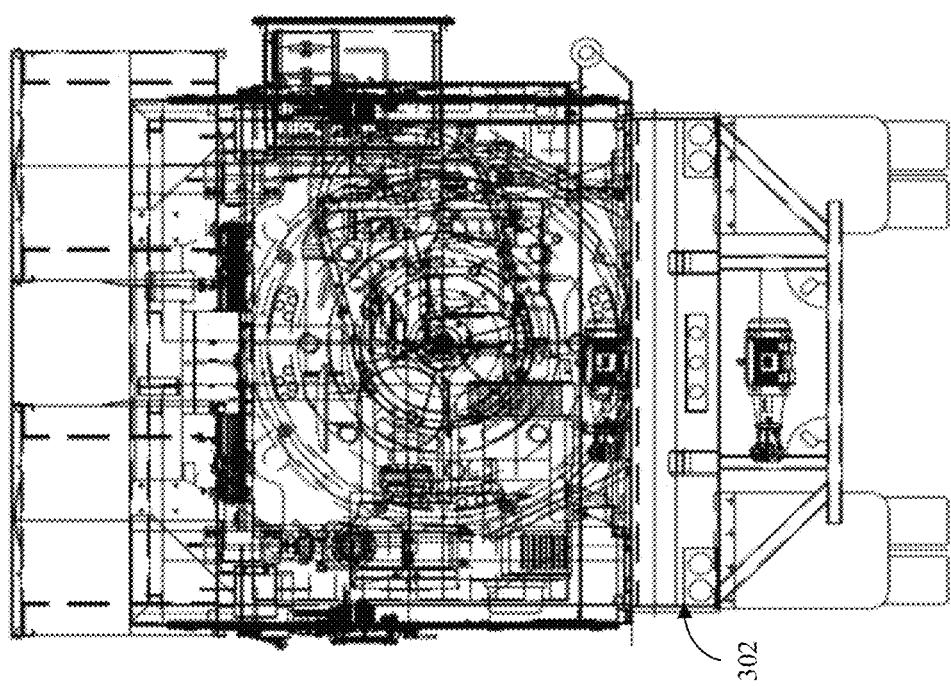
FIG. 3C is a rear end view of the first exemplary three axle hydraulic fracturing trailer of FIG. 3A, according to one or more aspects of the present disclosure.

Referring now to FIGS. 3A-3C, side, top and rear views of one exemplary embodiment of an exemplary fracturing system 300 using a first exemplary three axle hydraulic fracturing trailer 302 and releasably connected to an exemplary three axle tractor 304, according to one or more aspects of the present disclosure, are shown.

In some nonlimiting exemplary embodiments, system 300 may be designed so that the combined weight of tractor 304 and trailer 302 is less than 127,600 pounds, thereby allowing the combination to be legally transported on United States roadways to a fracturing site; however, as will be appreciated by those skilled in the relevant art(s) after reading the description herein, system 300 may be configured in order to meet one or more other weight restriction requirements as needed or desired. In some aspects, tractor 304 stays with trailer 302, while in other aspects, tractor 304 may be disconnected from trailer 302 and used to remove or retrieve another trailer 302. Tractor 304 may also be used for one or more other purposes, such as, for example and not limitation, to bring other equipment to the site, such as a blender, chemicals, fuel, or other needed items. By way of further example and not limitation, tractor 304 may comprise a Kenworth® T880, a Freightliner® 122SD, Peterbilt® 579, 389, 384, or the like.

Trailer 302 may include many of the components used at the fracturing site shown in FIG. 1. In the embodiment shown in FIG. 3, fracturing system 300 may include two pressure delivery devices in the form of pumps 306 (e.g., triplex, quadruplex, quintuplex, or the like). Each pump 306 may be powered by two electrically powered devices in the form of induction motors 308 (labeled only as induction motor 308a in FIG. 3, for clarity) (e.g., a 1,600 HP AC induction motor, available from General Electric, Siemens, Morelli Motori SPA, ATB, and weighing about 15,000 pounds), cooled by cooling fans 310. Induction motors 308 may be connected to pumps 306 via one or more various mechanical couplings such as, by way of example and not limitation, belts, pulley assemblies, and/or gear couplings. Pumps 306 may be fluidly coupled to a fracturing site fluid source, and they may be configurable to pressurize a fluid to at least a fracturing pressure. Power on trailer 302 may be supplied by at least one power source in the form of a diesel generator 312 with a cooling radiator 314. Two variable-frequency drives (VFD) 316 may be used to control the motor speed and torque by varying the motor input frequency and voltage. There may also be various cables 318 connecting the equipment (e.g., cable from the drive to the motor will run through the trailer frame). In some aspects, system 300 may be configured so that 2,500-3,200 HP may be delivered to each pump 306 because each pump 306 may be directly mechanically coupled to 2 AC induction motors 308. In some further aspects, each pump 306 and induction motor 308 may be modular, thereby allowing for facile removal and replacement when necessary.

Below are some examples of the type of equipment that may be used in system 300. While particular names and ratings are listed, other similar equipment may be used as may be apparent to those skilled in the relevant art(s) after reading the description herein. There are many different pumps 306 that may work in system 300. One example is a Gardner Denver GD-3000 quintuplex well service pump that has an output of 3,000 brake horse power (BHP). Each of these pumps weighs approximately 19,000 pounds (38,000 pounds for two). While this is a quintuplex pump, other pumps, such as a triplex pump, may also work. By way of example and not limitation, induction motors 308 may comprise 1,600 HP AC induction motors. By way of further example and not limitation, generator 312 may comprise a 200 HP Cummins diesel generator weighing approximately 2,000 pounds, which may be used to power auxiliary equipment, although higher rated generator sets may be used (i.e., those providing enough HP to drive the electric motors as disclosed: e.g., Cummings QST30 series available from Cummings Inc., Minneapolis, Minn.). To cool the generator, a 250 gallon per minute radiator may be used. By way of still further example and not limitation, variable-frequency drives (VFD) 316 may comprise 4,000 HP AC VFD drives with cooling systems, weighing approximately 18,000 pounds.

Along with this equipment, there may also be other auxiliary equipment on trailer 302. For example, in some nonlimiting exemplary embodiments, system 300 may include a second generator set, such as a 160 HP 600 volt generator to run one or more of:

one 40 HP cooling fan to run the cooling radiator;
two 10 HP cooling pumps to cool the 1,600 HP motors;
two 10 HP lube cooling fans;
two 10 HP lube pumps (one for each pump);
six fluorescent lights (lighting transformer and lighting panel);
one or more 110 volt outlets; and/or
twelve 30 amp 2 ton AC units.

In use, system 300 may be brought into a fracturing site 100 (not shown in FIGS. 3A-3C) and inserted into one of the pump openings. Pumps 306 may then be attached to manifold apparatus 106 (not shown in FIGS. 3A-3C). Generator 312 may then be started and the mechanicals and electrics of system 300 may be brought up to speed. Fluid plus additives may then be taken by manifold apparatus 106 to the intake of the pumps 306 and then pumped to well 104 (not shown in FIGS. 3A-3C). The flow rate may be controlled by VFD drive 316.

Figure 4A:
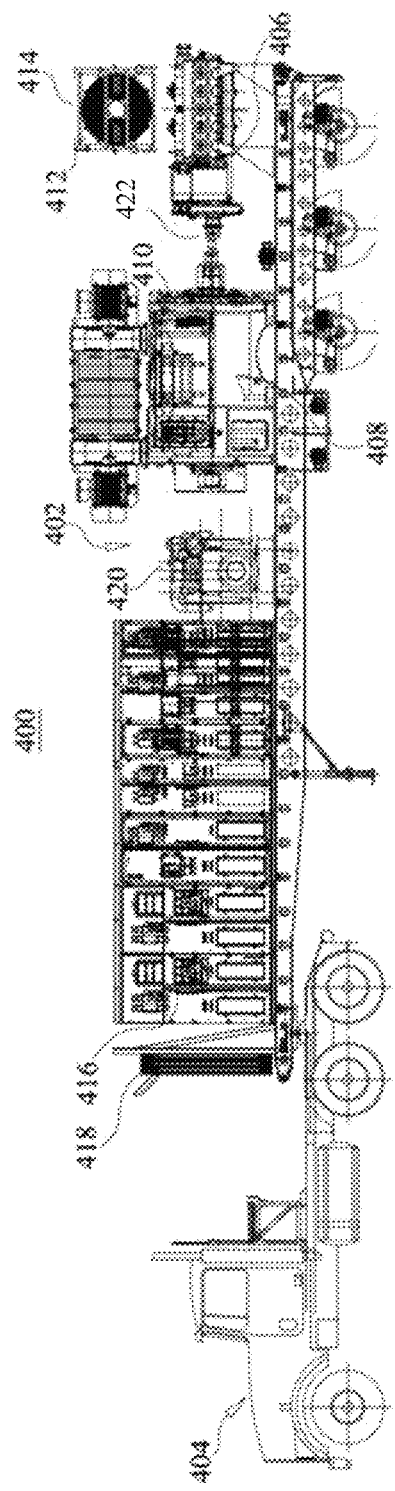
FIG. 4A is a side view of a second exemplary three axle hydraulic fracturing trailer connected to an exemplary three axle tractor, according to one or more aspects of the present disclosure.
Figure 4B:
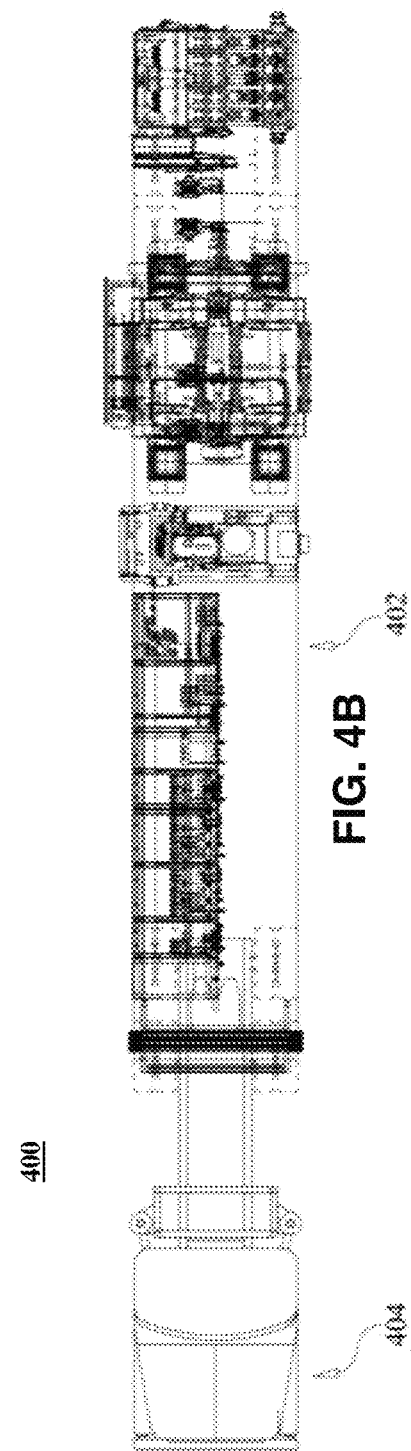
FIG. 4B is a top view of the second exemplary three axle hydraulic fracturing trailer and exemplary three axle tractor of FIG. 4A, according to one or more aspects of the present disclosure.
Figure 4C:
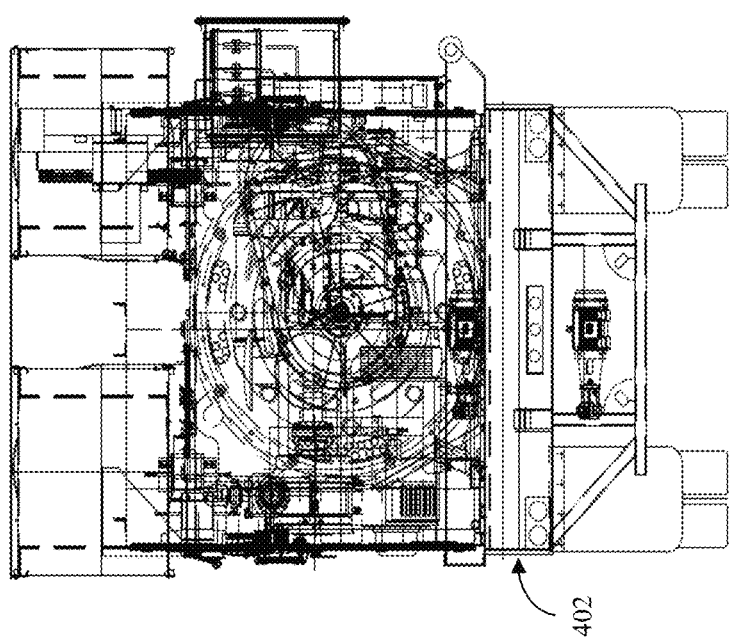
FIG. 4C is a rear end view of the second exemplary three axle hydraulic fracturing trailer of FIG. 4A, according to one or more aspects of the present disclosure.

Referring now to FIGS. 4A-4C, side, top and rear views of one exemplary embodiment of an exemplary fracturing system 400 using a second exemplary three axle hydraulic fracturing trailer 402 and releasably connected to an exemplary three axle tractor 404, according to one or more aspects of the present disclosure, are shown.

In some nonlimiting exemplary embodiments, system 400 may be designed so that the combined weight of tractor 404 and trailer 402 is less than 127,600 pounds, thereby allowing the combination to be legally transported on United States roadways to a fracturing site; however, as will be appreciated by those skilled in the relevant art(s) after reading the description herein, system 400 may be configured in order to meet one or more other weight restriction requirements as needed or desired. In some embodiments, tractor 404 stays with trailer 402, while in other embodiments, tractor 404 may be disconnected from trailer 402 and used to remove or retrieve another trailer 402. Tractor 404 may also be used for one or more other purposes, such as, for example and not limitation, to bring other equipment to the site, such as a blender, chemicals, fuel, or other items. By way of further example and not limitation, tractor 404 may comprise a Kenworth® T880, a Freightliner® 122SD, Peterbilt® 579, 389, 384, or the like.

Trailer 402 may include many of the components used at the fracturing site shown in FIG. 1. Trailer 402 may be substantially similar to trailer 302 discussed above, and may carry many of the same types of equipment, but in less numbers and it may weigh less. For this reason, among others, in some nonlimiting exemplary embodiments trailer 402 may be towed by a two axle tractor instead of a three axle tractor 404. In the embodiment shown in FIG. 4, system 400 may include at least one pressure delivering device in the form of pump 406 powered by at least one electrically powered device in the form of induction motor 408 cooled by at least one cooling fan 410. Induction motor 408 may be connected to pump 406 via drive train, transmission and torque converter 422. Pump 406 may be fluidly coupled to a fracturing site fluid source, and pump 406 may be configurable to pressurize a fluid to at least a fracturing pressure. Power on trailer 402 may be supplied by at least one power source in the form of a diesel generator 412 with a cooling radiator 414. A variable-frequency drive (VFD) 416 may be used to control the motor speed and torque by varying the motor input frequency and voltage. There may also be various cables 418 connecting the equipment.

Below are some examples of the type of equipment that may be used in system 400. While particular names and ratings are listed, other similar equipment may be used as may be apparent to those skilled in the relevant art(s) after reading the description herein. There are many different pressure deliver devices in the form of pumps 406 that may work in system 400. One example is a Weir SPM quintuplex well service pump that has an output of 3,500 BHP and an approximate weight of 19,000 pounds. While this is a quintuplex pump, other pumps such as a triplex pump, may also be used. By way of example and not limitation, each induction motor 408 may comprise a 2,680 HP AC induction motor. By way of further example and not limitation, generator 412 may comprise a 126-160 HP diesel generator weighing approximately 3,500 pounds. By way of still further example and not limitation, variable-frequency drive (VFD) 416 may comprise a 4,000 HP AC VFD drive with cooling system weighing approximately 8,000 pounds.

Along with this equipment, there may also be other auxiliary equipment on trailer 402. For example, in some nonlimiting exemplary embodiments, system 400 may include a second generator 420, such as a 160 HP 600 volt generator to run one or more of:

one cooling fan to run the cooling radiator;
one or more cooling pumps to cool the 126 HP motor;
one or more lube cooling fans;
one or more lube pumps;
one or more fluorescent lights (lighting transformer and lighting panel);
one or more 110 volt outlets; and/or
one or more 30 amp 2 ton AC units.

In use, system 400 may be brought into a fracturing site 100 (not shown in FIGS. 4A-4C) and inserted into one of the pump openings. Pump 406 may then be attached to manifold apparatus 106 (not shown in FIGS. 4A-4C). Generator 412 may then be started and the mechanicals and electrics of system 400 may be brought up to speed. Fluid plus additives may then be taken by manifold 106 to the intake of pump 406 and then pumped to well 104 (not shown in FIGS. 4A-4C). The flow rate may be controlled by VFD 416.

Figure 5A:
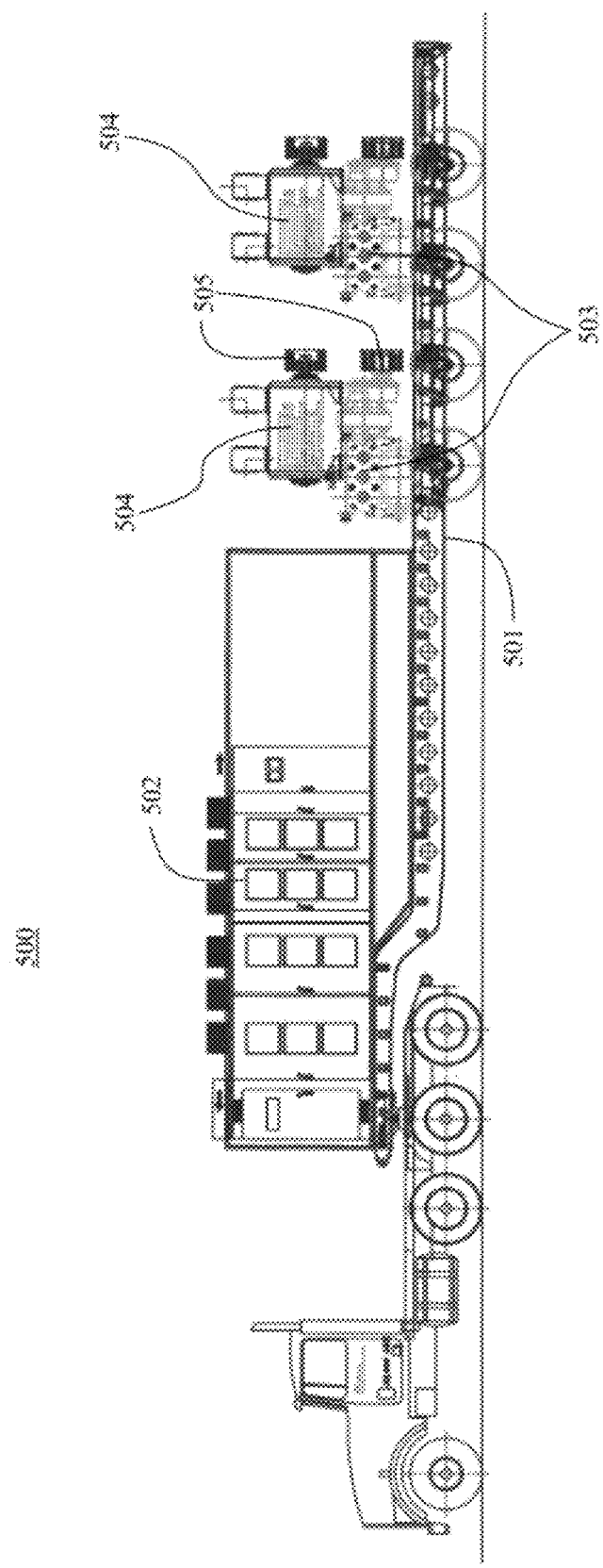
FIG. 5A is a side view of an exemplary four axle hydraulic fracturing unit showing exemplary single horizontal electric induction motors mounted on exemplary triplex fluid pumps, according to one or more aspects of the present disclosure.
Figure 5B:
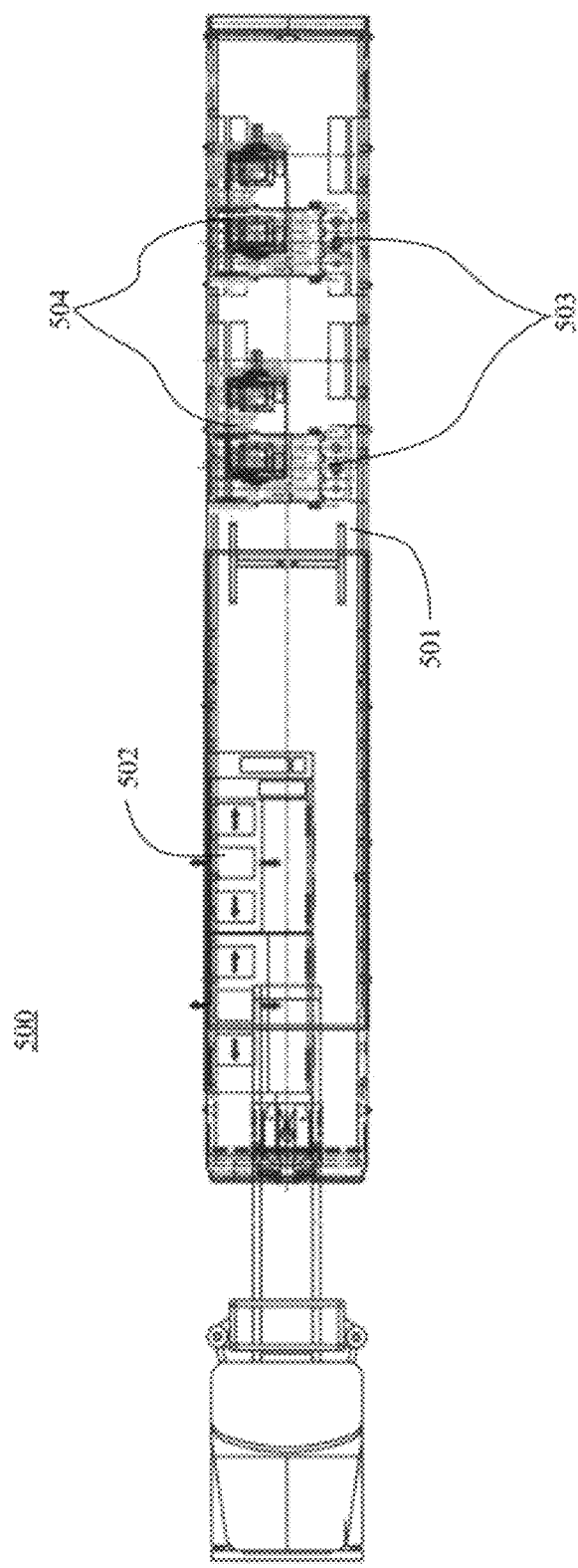
FIG. 5B is a top view of an exemplary four axle hydraulic fracturing unit showing exemplary single horizontal electric induction motors mounted on exemplary triplex fluid pumps, according to one or more aspects of the present disclosure.

Referring now to FIGS. 5A-5B, another exemplary embodiment in the form of exemplary system 500, according to one or more aspects of the present disclosure, is shown.

In system 500, a trailer 501 may have mounted thereon at least one VFD 502, two pressure delivery devices in the form of triplex pumps 503 and a single electrically powered device in the form of horizontal electric induction motor 504 mounted on each pump 503. In system 500, pumps 503 may be mechanically coupled to induction motors 504 via pulley assemblies 505. Induction motors 504 may have, for example and not limitation, the specifications as listed in Table 1.

TABLE 1

| Induction Motor Specifications | |
| --- | --- |
| HP | 1,098 to 2,800 |
| Voltage | 1,040 to 2,800 |
| Htz | 10 to 100 |
| Poles | 6 |
| RPM | 187 to 1982 |
| Insulation | Class H |
| Ambient Temperature | 45° C. |
| Temperature Raise | 145° C. |
| Weight | 15,750 pounds. |
| Enclosure | O.D.P. Forced Ventilation |

System 500 may provide a more compact ventilation system relative to, for example, system 400, including that system 500 makes more efficient use of space (e.g., to accommodate larger generators or more than one generator).

Figure 6A:
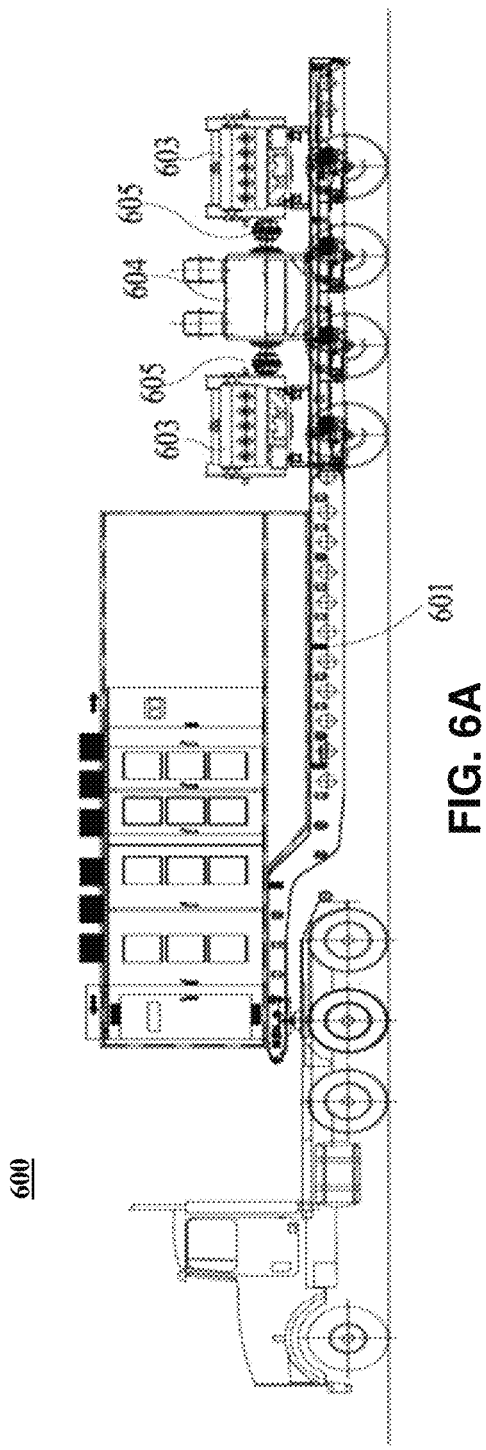
FIG. 6A is a side view of an exemplary four axle hydraulic fracturing unit showing exemplary single horizontal electric induction motors mounted on an exemplary trailer and mechanically coupled to exemplary quintuplex fluid pumps, according to one or more aspects of the present disclosure.
Figure 6B:
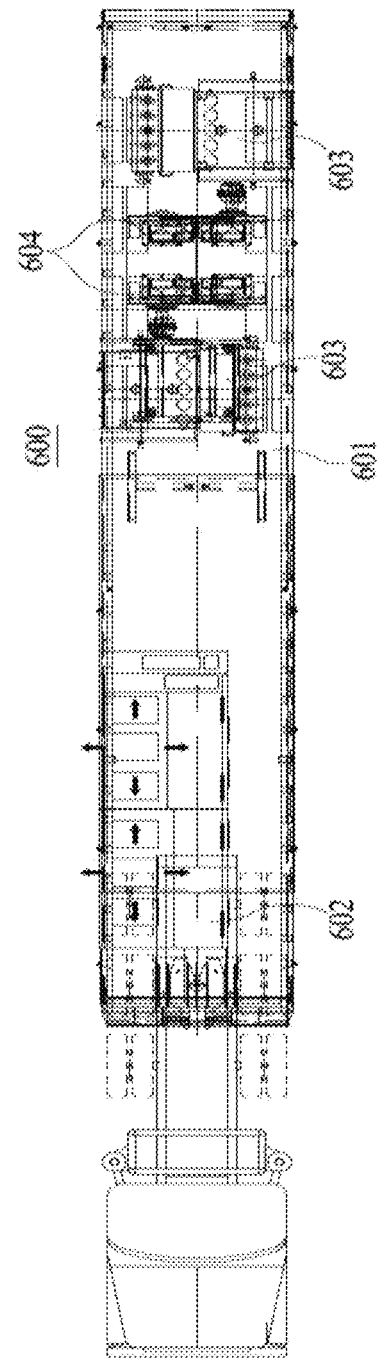
FIG. 6B is a top view of an exemplary four axle hydraulic fracturing unit showing exemplary single horizontal electric induction motors mounted on an exemplary trailer and mechanically coupled to exemplary quintuplex fluid pumps, according to one or more aspects of the present disclosure.
Figure 7A:
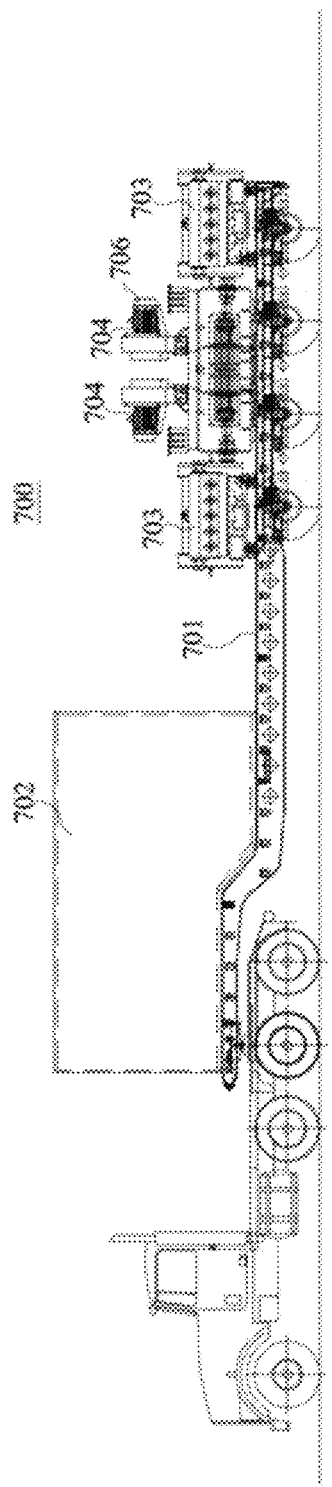
FIG. 7A is a side view of an exemplary four axle hydraulic fracturing unit showing exemplary single horizontal electric induction motors mounted on an exemplary trailer and mechanically coupled to exemplary quintuplex fluid pumps in a separate and distinct configuration with a different ventilation system relative to that of FIGS. 6A-6B, according to one or more aspects of the present disclosure.
Figure 7B:
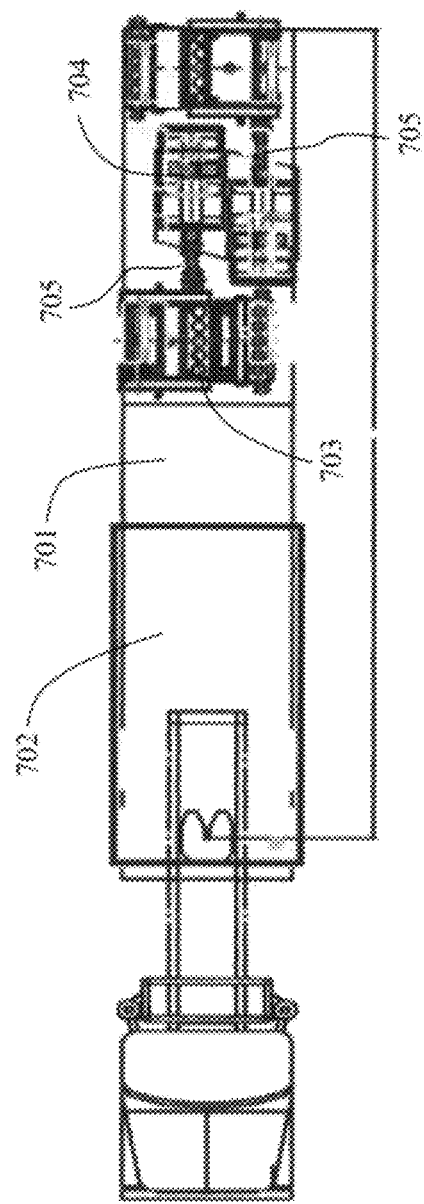
FIG. 7B is a top view of an exemplary four axle hydraulic fracturing unit showing exemplary single horizontal electric induction motors mounted on an exemplary trailer and mechanically coupled to exemplary quintuplex fluid pumps in a separate and distinct configuration with a different ventilation system relative to that of FIGS. 6A-6B, according to one or more aspects of the present disclosure.
Figure 7C:
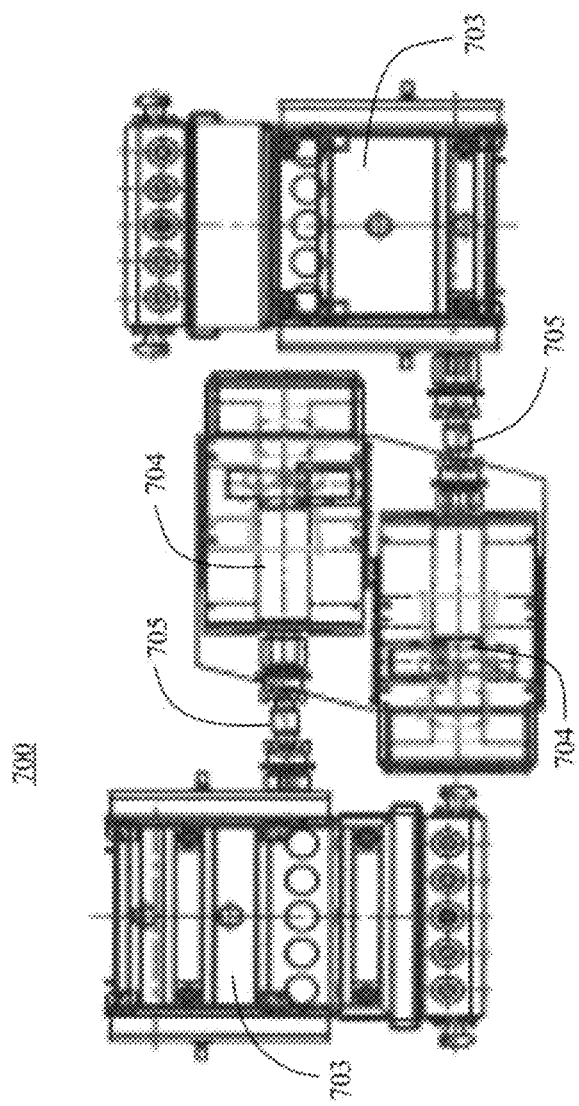
FIG. 7C is a top view of the exemplary motors coupled to the exemplary pumps in detail, according to one or more aspects of the present disclosure.
Figure 7D:
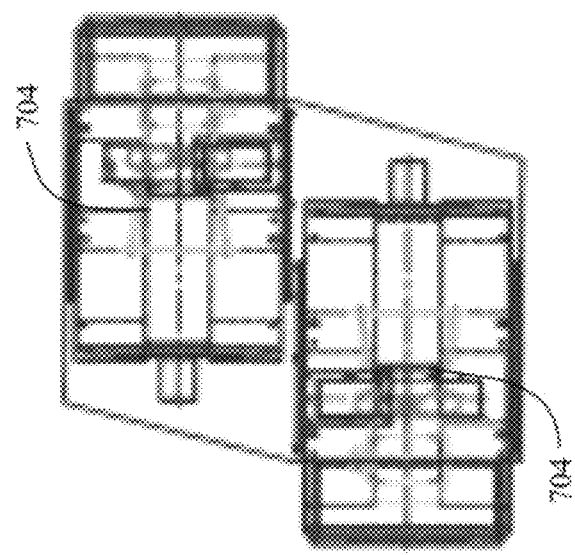
FIG. 7D is a top view of the exemplary motors in detail, according to one or more aspects of the present disclosure.
Figure 7E:
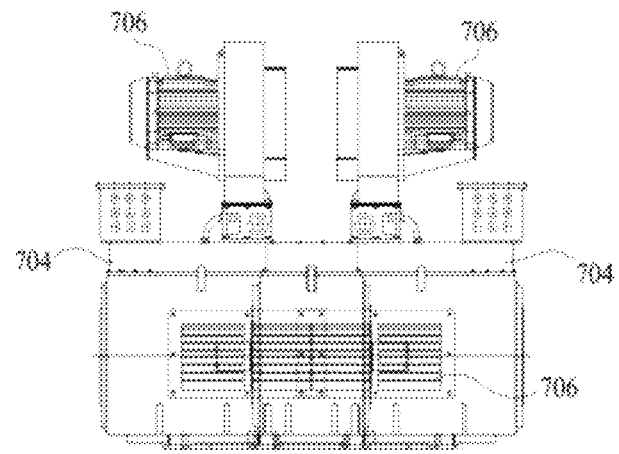
FIG. 7E is a side view of the exemplary motors in detail, according to one or more aspects of the present disclosure.
Figure 7F:
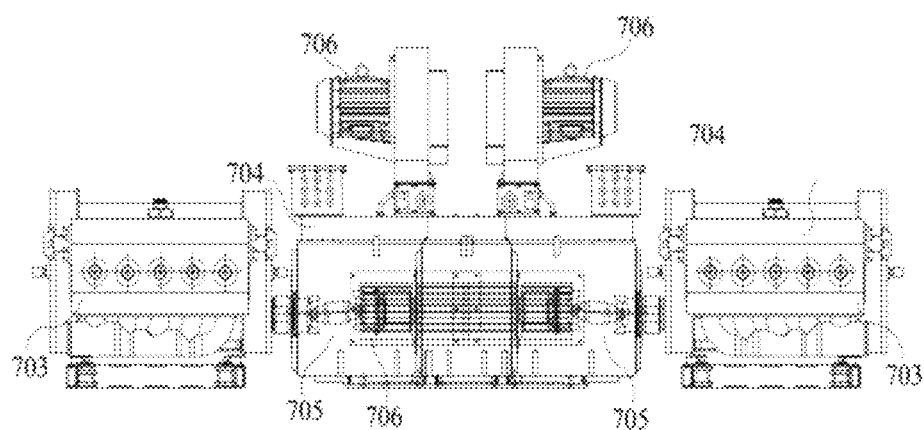
FIG. 7F is a side view of the exemplary motor coupled to the exemplary pumps in detail, according to one or more aspects of the present disclosure.

Referring now to FIGS. 6A-6B, another exemplary embodiment in the form of exemplary system 600, according to one or more aspects of the present disclosure, is shown.

In system 600, a trailer 601 has mounted thereon at least one VFD 602, two pressure delivery devices in the form of quintuplex pumps 603 and a single electrically powered device in the form of horizontal electric induction motor 604 in mechanical communication with each pump 603. In system 600, pumps 603 may be mechanically coupled to induction motors 604 via transmission 605. Induction motors 604 may have, for example and not limitation, the same specifications as for system 500 in FIGS. 5A-5B. In system 600, the positioning of motors 604/pumps 603 is distinct from their positioning relative to system 500. In system 600, motors 604 may be mounted to trailer 601 and transmissions 605 may face away from a center between the motor 604/pump 603 assemblies.

Referring now to FIGS. 7A-7F, another exemplary embodiment in the form of exemplary system 700, according to one or more aspects of the present disclosure, is shown.

In system 700, a trailer 701 may have mounted thereon at least one drive house 702 (control house) which contains at least one VFD, at least one load brake switch (circuit breaker), and an MCC panel; two pressure delivery devices in the form of quintuplex pumps 703 and a single electrically powered device in the form of horizontal electric induction motor 704 in mechanical communication with each pump 703. In system 700, pumps 703 may be mechanically coupled to induction motors 704 via transmission 705. Induction motors 704 may have, for example and not limitation, the same specifications as for system 500 in FIGS. 5A-5B, however, the ventilation system 706 may be different (forced air blower system). In system 700, the positioning of motors 704/pump s 703 is distinct from their positioning relative to system 500 or 600. While motors 604 may be positioned such that they are relatively superimposable when viewed from the side (FIG. 6A), in system 700 the front of motors 704, including the crank shaft, substantially overlap and face away from each other, allowing efficient use of a shorter 40 foot step deck trailer. As in system 600, in system 700 motors 704 are mounted to trailer 701 and transmissions 705 face away from a center between the motor 704/pump 703 assemblies. In some nonlimiting exemplary embodiments, trailer 701 may be a 46 foot step deck trailer.

Figure 8:
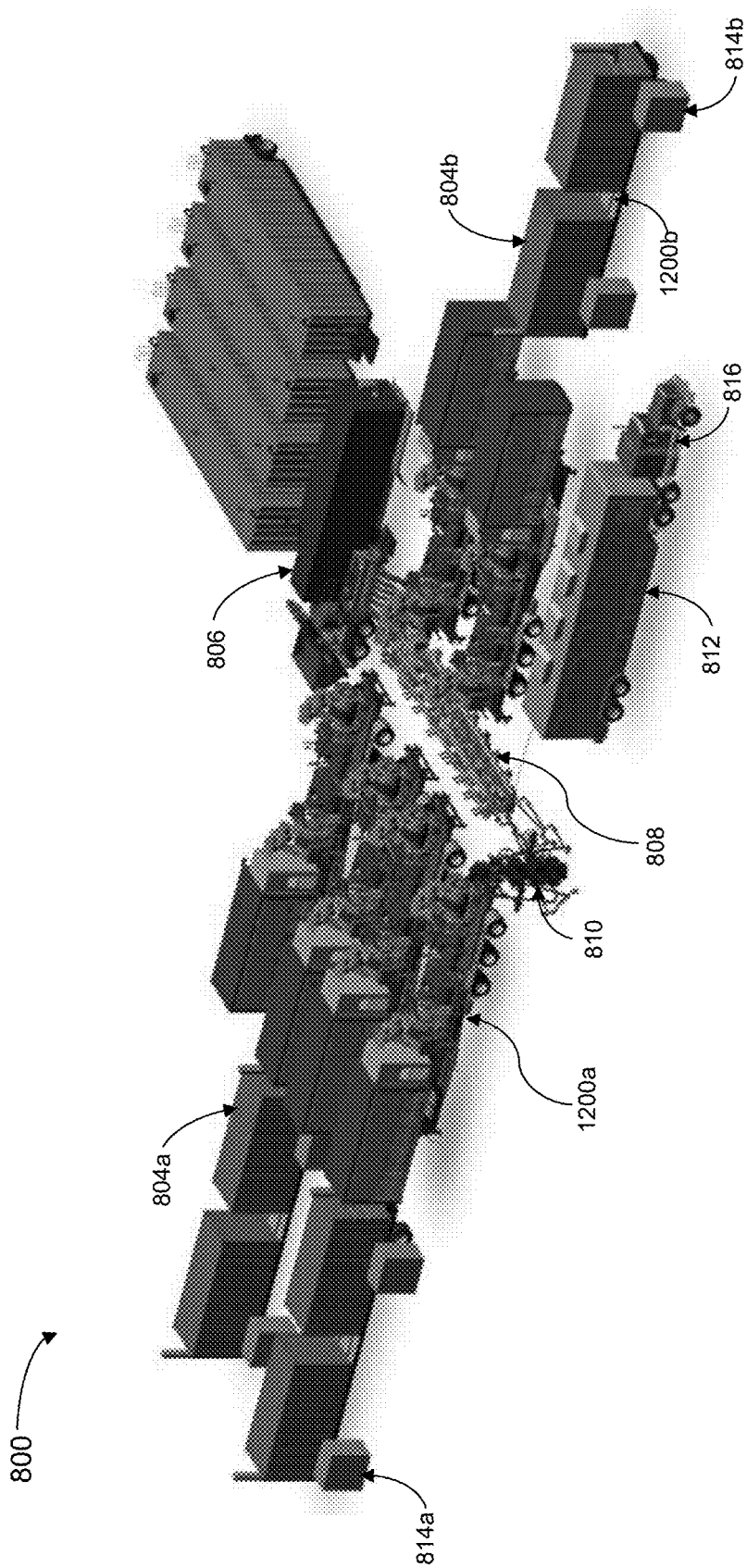
FIG. 8 is an image of an exemplary hydraulic fracturing system that is configured for enhanced mobility, according to one or more aspects of the present disclosure.

Referring now to FIG. 8, an image of an exemplary hydraulic fracturing system 800 that is configured for enhanced mobility, according to one or more aspects of the present disclosure, is shown.

Hydraulic fracturing system 800 may be configured to function using one or more custom designed, relatively lightweight and compact components, thereby making it lighter and allowing it to take up less space and require less maintenance than existing hydraulic fracturing systems. Hydraulic fracturing system 800 may comprise at least one frame mounted unit configured to be transportable from at least one first location to at least one second location. In some aspects, the at least one frame mounted unit may take the form of a trailer 1200 (labeled only as trailers 1200*a-b* in FIG. 8, for clarity). In some aspects, hydraulic fracturing system 800 may further comprise at least one power supply housing 804 (labeled only as power supply housings 804*a-b* in FIG. 8, for clarity). One or more power supply housings 804 may be removably or permanently mounted upon a frame mounted unit, such as, for example and not limitation, a trailer 1200 or skid 1102 (not shown in FIG. 8). In some further aspects, hydraulic fracturing system 800 may further comprise at least one blending apparatus 806, at least one manifold apparatus 808, at least one wellhead 810, and at least one control vehicle 812, which may, in some nonlimiting exemplary embodiments, be configured upon a frame mounted unit, such as a trailer 1200 that is removably coupled to at least one mobile unit 816 in the form of a tractor.

Each frame mounted unit may include various electrically powered devices 1104 (not labeled in FIG. 8) and/or pressure delivering devices 1106 (not labeled in FIG. 8) for use with a hydraulic fracturing process, such as, by way of example and not limitation, one or more induction motors and/or one or more pumping mechanisms, respectively. Such electrically powered devices and/or pressure delivering devices may be at least partially powered by one or more power supply apparatuses 900 (not shown in FIG. 8) or other power sources that may be at least partially contained within power supply housing(s) 804. In some aspects, each power supply housing 804 may contain a single power supply apparatus 900, and there may be a different power supply apparatus 900 for each frame mounted unit, thereby allowing system 800 to be scalable.

During the operation of hydraulic fracturing system 800, power supply apparatus(es) 900 may generate power, such as, for example and not limitation, electric power, that may be delivered to electrically powered device(s) 1104 via one or more cables, wires, and/or similar materials and utilized by electrically powered device(s) 1104 in order to at least partially drive pressure delivering device(s) 1106. The functioning of pressure delivering device(s) 1106 may facilitate the delivery of pressurized fracturing fluid from blending apparatus 806, where the fracturing fluid is prepared by mixing water with proppant, through manifold apparatus 808 to wellhead 810. Various operations and functions of hydraulic fracturing system 800 may be monitored and/or controlled at/within control vehicle(s) 812.

In some aspects, power supply apparatus 900 may further comprise at least one motor control breaker, or switchgear 814 (labeled only as switchgears 814*a-b* in FIG. 8, for clarity), in the form of a utility grade recloser in order to protect the circuitry of hydraulic fracturing system 800, to prevent various components of system 800 from overheating (such as, for example and not limitation, electrically powered device(s) 1104 and/or the drive system for power supply apparatus 900), as well as toggle system 800 between an "on" setting, in which it is operating, and an "off" setting, in which system 800 is not operating. In some nonlimiting exemplary embodiments, switchgear(s) 814 may be positioned proximal to power supply apparatus(es) 900, with one switchgear 814 for each power supply apparatus 900. In some additional aspects, each switchgear 814 may include built-in functionality that allows at least one user to monitor and/or control the power quality of at least one power generating device that at least partially comprises power supply apparatus 900. By way of example and not limitation, the power quality may be monitored by one or more sensing devices such as, for example and not limitation, voltage and/or current transducers configured within or upon each switchgear 814 in order to measure the voltage and/or electric current, respectively, and/or the electrical signal being output by each power generating device. The voltage and/or electric current measurements may be displayed, by way of example and not limitation, upon one or more display screens, monitors, and/or similar display devices as may be apparent to those skilled in the relevant art(s) after reading the description herein that may, in some aspects, be communicatively coupled to one or more computing devices, either wirelessly or via wired connectivity. The display device(s) and/or computing device(s) may be configured within or upon one or more portions of one or more control vehicles 812. In some additional nonlimiting exemplary embodiments, the one or more display devices may be communicatively coupled to the sensing device(s) and/or at least one portion of each switchgear 814 itself, either wirelessly or via wired connectivity. In some further aspects, the power quality aspect measurement(s) from each power generating device may be taken and displayed in substantially real time. The power quality aspect measurement(s) may be observed by one or more human users, or they may be monitored by one or more computing devices.

If it is discovered that one or more power generating devices have one or more unsatisfactory voltage, electric current, and/or electrical signal measurements, such as, for example and not limitation, if electrical harmonics are detected, if a poor power factor is observed, and/or if voltage instability is occurring, then one or more steps may be taken to resolve the problem(s). By way of example and not limitation, one or more filtering techniques may be applied, such as by adding one or more capacitors. Additionally, the problematic power generating device(s) may be redesigned to fix any electrical harmonics. Furthermore, the speed of the power generating device(s) having issues may be adjusted, either by human input or at least semi-autonomously by one or more computing devices.

Frame mounted unit(s) such as trailer(s) 1200, power supply housing(s) 804, blending apparatus(es) 806, manifold apparatus(es) 808, and/or control vehicle(s) 812 may be transported to a hydraulic fracturing site via any appropriate mobile unit 816 or vehicle, such as, by way of example and not limitation, a two or three axle tractor. Examples of appropriate tractors include, without limitation, a KENWORTH® T880, a FREIGHTLINER® 122SD, a PETERBILT® 579, 389, or 384, or the like. Regardless of the type of tractor or mobile unit 816 used, in some aspects, the combination of the tractor/mobile unit 816 and an individual frame mounted unit or a tractor/mobile unit 816 and a power supply housing 804 with at least one power supply apparatus 900 therein may have a combined weight that does not exceed 127,600 pounds so as to be legally transportable upon United States roadways; however, as will be appreciated by those skilled in the relevant art(s) after reading the description herein, the combined weight may be adjusted in order to meet one or more other weight restriction requirements as needed or desired.

Figure 9:
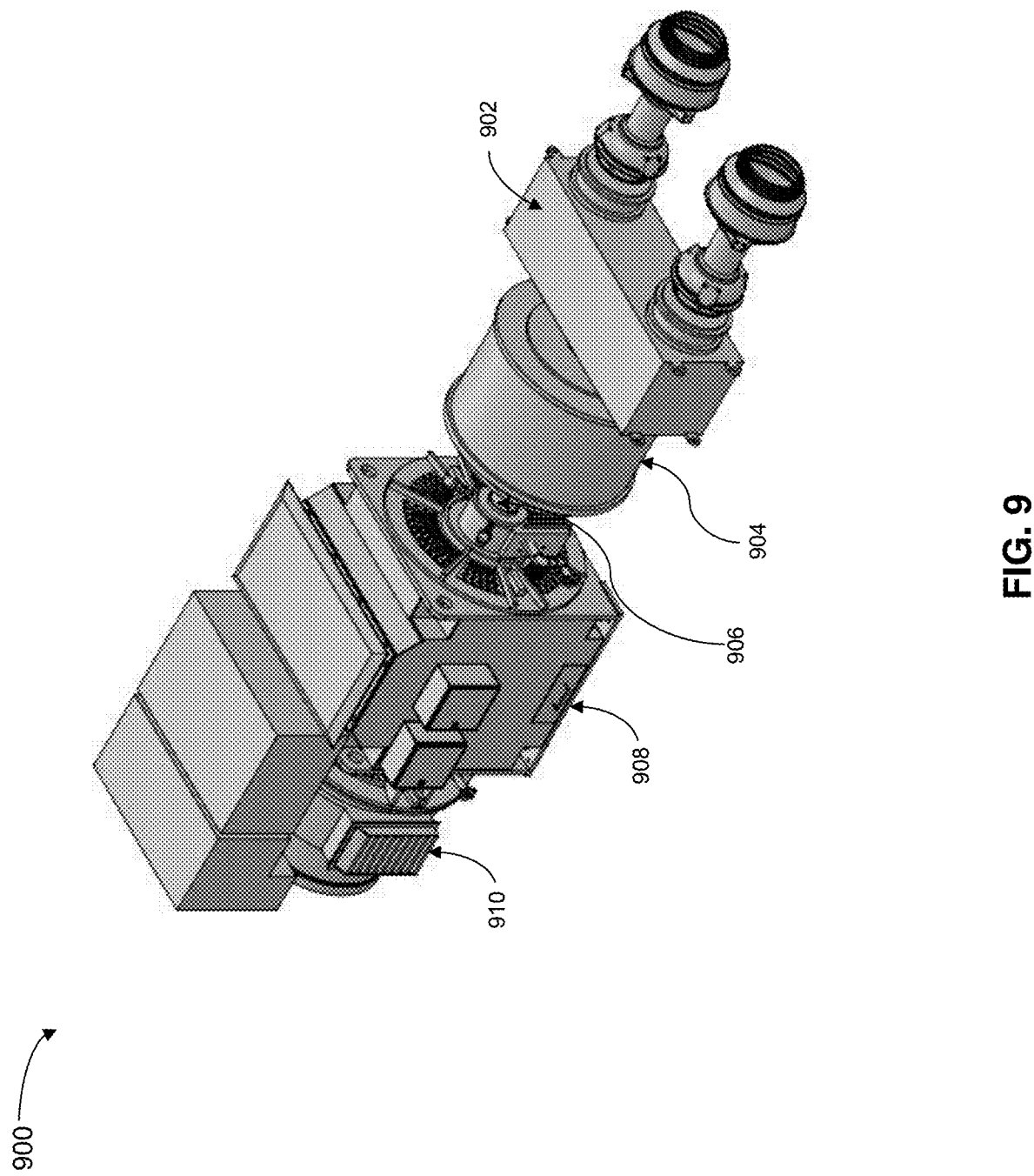
FIG. 9 is a perspective view of an exemplary power supply apparatus for a hydraulic fracturing system that is configured for enhanced mobility, according to one or more aspects of the present disclosure.

Referring now to FIG. 9, a perspective view of an exemplary power supply apparatus 900 for hydraulic fracturing system 800 that is configured for enhanced mobility, according to one or more aspects of the present disclosure, is shown.

In some aspects, power supply apparatus 900 may comprise at least one turbine 902, such as, by way of example and not limitation, a twin-engine dual fuel turbine 902, that uses a single shaft 906 to drive at least one power generating device. In some nonlimiting exemplary embodiments, turbine 902 may run on gas (such as, without limitation, natural gas) or diesel fuel and have a total output of about 5.00 megawatts. In aspects wherein turbine 902 runs on natural gas, software and associated computing device(s) may facilitate the monitoring and adjustment of the British thermal units (BTU) of the gas in substantially real time in order to maximize the efficiency of turbine 902. Such computing device(s) may be housed, by way of example and not limitation, within one or more control vehicles 812. The monitoring and adjustment functions may be performed by one or more human users or may be performed at least semi-autonomously by the computing device(s). In some additional nonlimiting embodiments, at least one portion of the natural gas that may be used to fuel turbine(s) 902 may be obtained from the fracturing site at which a hydraulic fracturing system 800 may be operating.

In some aspects, power supply apparatus 900 may include power generating devices in the form of a 4.1 megawatt 2100 volt three phase permanent magnet generator 908 that produces approximately 6300 volts alternating current (VAC) total operating at about 270 Hertz (Hz) and a 0.6 megawatt 480 volt three phase generator 910 operating at about 60 Hz. In some additional aspects, instead of one 4.1 megawatt generator 908, two 2.05 megawatt 2100 volt three phase permanent magnet generators may be used that each produce approximately 6300 VAC total and operate at about 270 Hz. As will be appreciated by those skilled in the relevant art(s) after reading the description herein, the generators may operate at different frequencies other than 270 Hz, such as anywhere between 70 and 400 Hz, with 250 to 300 Hz being preferred. A gearbox 904 may be included upon shaft 906 to adjust the output of turbine 902 to a desired input for the power generating device(s) as needed. All power generating devices may be driven by a single shaft 906.

In some aspects, power supply apparatus 900 of hydraulic fracturing system 800 may include a drive system that uses a multi-pulse rectifier bridge instead of a step-down transformer, thereby enabling the drive system to be relatively lightweight, have reduced maintenance needs, and have fewer components that may fail. AC to DC conversion may be performed by two 6-pulse diode based rectifier bridges connected in parallel. There may be no need for a bank of capacitors to store and filter energy. DC to AC conversion may be performed using a fully modular power cell based on multi-level inverters. The inverters may comprise a modular multi-level (M2L) topology. Each M2L medium voltage (MV) inverter may be configured to control an individual pressure delivering device 1106 (not shown in FIG. 9) in the form of a pumping mechanism independently from the operation or performance of any other pressure delivering device. Additionally, each M2L MV inverter may be fully modular and may comprise more power cells for any specific voltage than other currently available power cell based MV inverters. This modularity may allow for quick and easy power cell replacement, with the mean time to repair (MTTR) being less than 15 minutes.

Unlike other power cell based drive systems that use electrolytic capacitors, the DC capacitors used in M2L power cells may comprise dry-type film capacitors and therefore do not need to go through a reforming process when not in operation. Thus, there may be no need to send M2L power cells back to a manufacturer or a third-party shop for reforming on a yearly or bi-yearly basis. This may help reduce the need for an ongoing preventative maintenance program and the costs and downtime that may be associated therewith.

The cooling system of the M2L MV drive utilizes modular fan and fan cage combination assemblies. Such modular design may facilitate fast and easy fan replacement in the field, with a MTTR for fan assembly replacement being less than 15 minutes.

The M2L MV drive may also be beneficial in that it is equipped with an advanced arc flash detection system. Each M2L power cell may include a photodiode flash detection sensor that gets activated in a neighborhood of light. The power cell that detects the arc flash light may have the ability to turn its insulated gate bipolar transistor (IGBT) off within several microseconds and may in turn signal the remaining power cells to stop switching. This results in the isolation of the motor and load from a fault in less than about 150 microseconds.

Another benefit of using M2L power cells is that they contain embedded circuitry and sensors to monitor cell performance and health. Parameters that may be sensed and monitored in each power cell include: voltages, currents, voltages across top and bottom capacitor banks, control supply voltages, IGBT junction temperatures, and printed circuit board (PCB) temperature. Because each power cell inherently senses voltage and current, there is no need for external voltage and current sensors to be installed on motor leads. Values sensed by the power cells may be accessible locally as well as remotely via a human-machine interface (HMI), PC tool, or standard communication port. The sensed information may be used to monitor the health of each power cell as well as predict an increased chance of power cell failure. If there is any indication that a power cell has an aged or degraded component, such as, for example, an increased junction temperature in an IGBT, then the power cell may be replaced during its next scheduled maintenance and any unpredicted downtime may be reduced.

A further benefit of the M2L drive is that it may include a pre-charge system. The high resistor and contactor combination may allow the power cell capacitors to be charged without subjecting the supply power system to high inrush currents. Every start process may begin with the pre-charge system. Upon completion of the capacitors' pre-charge, the pre-charge circuit may be bypassed using a contactor. This process takes less than five minutes.

Referring now to FIGS. 10A-10H, various views of an exemplary power generation unit 1000 for hydraulic fracturing system 800 that is configured for enhanced mobility, according to one or more aspects of the present disclosure, are shown.

In some aspects, power generation unit 1000 may comprise 4.1 megawatt generator 908 and 0.6 megawatt generator 910; however, as will be appreciated by those skilled in the relevant art(s) after reading the description herein, other power generating device(s) may be used without departing from the spirit and scope of the present disclosure. In some nonlimiting exemplary embodiments, generator 908 and generator 910 may be coupled together via a junction box with two portions (labeled as junction box portions 1002a-b in FIG. 10A). Generator 910 may include at least one intake 1004 while generator 908 may include at least one intake 1006. Similarly, generator 910 may include at least one exhaust 1008 while generator 908 may include at least one exhaust 1010.

Figure 11B:
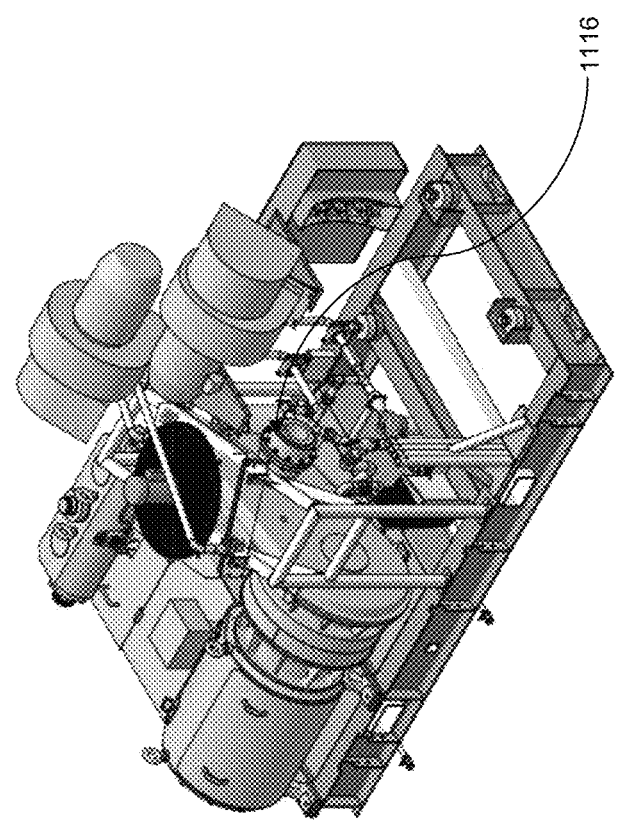
FIGS. 11A-11B are front and rear perspective views, respectively, of exemplary power recipients upon a first exemplary frame mounted unit in the form of a skid for use with a hydraulic fracturing system that is configured for enhanced mobility, according to one or more aspects of the present disclosure.
Figure 11A:
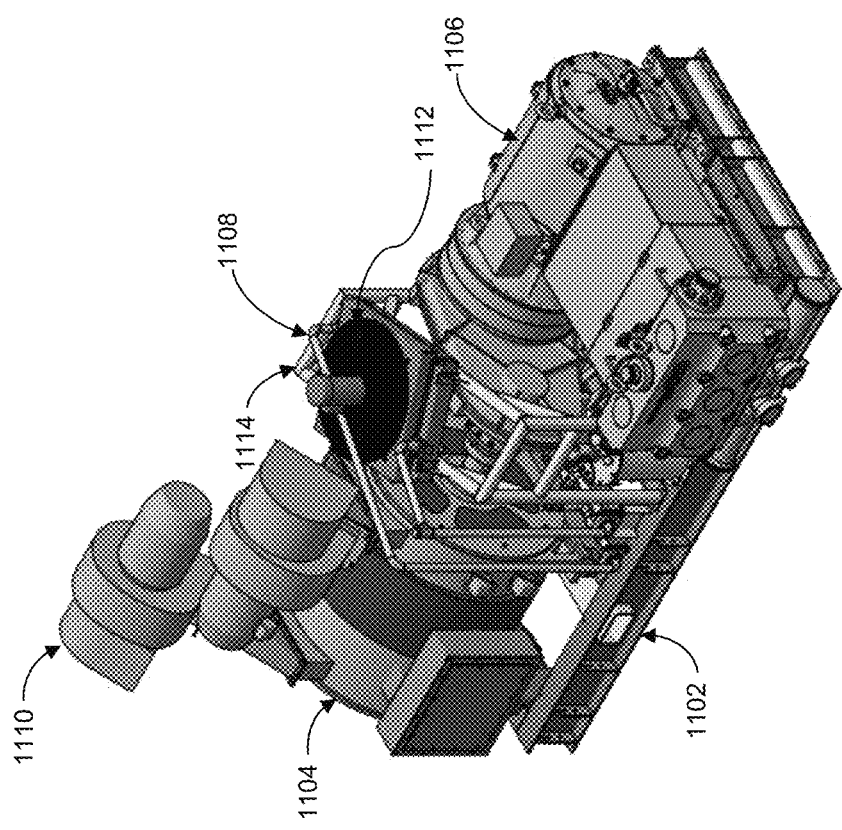

Referring now to FIGS. 11A-11B, front and rear perspective views, respectively, of exemplary power recipients upon a first exemplary frame mounted unit in the form of a skid 1102 for use with hydraulic fracturing system 800 that is configured for enhanced mobility, according to one or more aspects of the present disclosure, are shown.

In some aspects, the power recipients upon skid 1102 may be configured to facilitate the delivery of an amount of pressurized fracturing fluid to at least one wellbore. To that end, skid 1102 may comprise at least one electrically powered device 1104 configured to at least partially facilitate the functioning at least one pressure delivering device 1106 by being coupled thereto by one or more mechanical couplings 1116, such as, by way of example and not limitation, belts, pulley assemblies, and/or gear couplings (shown as a gear coupling in FIG. 11). Electrically powered device(s) 1104 and pressure delivering device(s) 1106 may be removably or permanently mounted upon skid 1102 via any appropriate means as may be apparent to those skilled in the relevant art(s) after reading the description herein, including via one or more bolts, nuts, nails, washers, pins, clamps, clasps, welded bonds, adhesives, and the like. By way of example and not limitation, in some additional aspects, each electrically powered device 1104 may comprise an induction motor and each pressure delivering device 1106 may comprise a pumping mechanism. In some nonlimiting exemplary embodiments, each induction motor may comprise a custom induction motor capable of supplying at least 2,000 to 3,500 HP (such as, by way of example and not limitation, 2,550 HP) and having an operating voltage ranging from 3,500 to 4,500 volts (such as, by way of example and not limitation, 3,900 volts) and may be configured to be relatively small and lightweight, weighing approximately 8,000 to 13,000 pounds. In some additional nonlimiting exemplary embodiments, each pumping mechanism may comprise a reciprocating pump; a high-pressure pump; a well service pump, such as, by way of example and not limitation, a triplex plunger-style fluid pump or a quintuplex plunger-style fluid pump (such as, by way of further example and not limitation, a Gardner Denver GD-3000 quintuplex well service pump that has an output of 3,000 BHP); as well as any similar appropriate pumping mechanism as may be apparent to those skilled in the relevant art(s) after reading the description herein. In some further aspects, a single skid 1102 may comprise an induction motor and pumping mechanism with a combined total weight of approximately 37,000 pounds, thereby enabling skid 1102 to be relatively lightweight.

In some aspects, electrically powered device(s) 1104 may be cooled via at least one cooling medium, such as liquid, air, and/or gas. In some additional aspects, electrically powered device(s) 1104 may be forced air cooled by at least one blowing device 1110, such as, by way of example and not limitation, at least one 15 HP blower. In some further aspects, the various components upon skid 1102, including electrically powered device(s) 1104 and/or pressure delivering device(s) 1106 may receive cooling via at least one cooling radiator 1112 with a drain hole, which may be permanently or removably affixed to skid 1102 via at least one radiator stand 1114 or other similar configuration. Cooling radiator 1112 may be affixed by any appropriate means as may be apparent to those skilled in the relevant art(s) after reading the description herein, including, for example and not limitation, via one or more bolts, nuts, nails, washers, pins, clamps, clasps, welded bonds, adhesives, and the like In some nonlimiting exemplary embodiments, skid 1102 may include a lubrication system to lubricate the various components thereon, including electrically powered device(s) 1104 and pressure delivering device(s) 1106. Such lubrication system may include a system of hoses, tubes, and/or pipes 1108 that may be configured to distribute lubricant to various components upon skid 1102.

Figure 12:
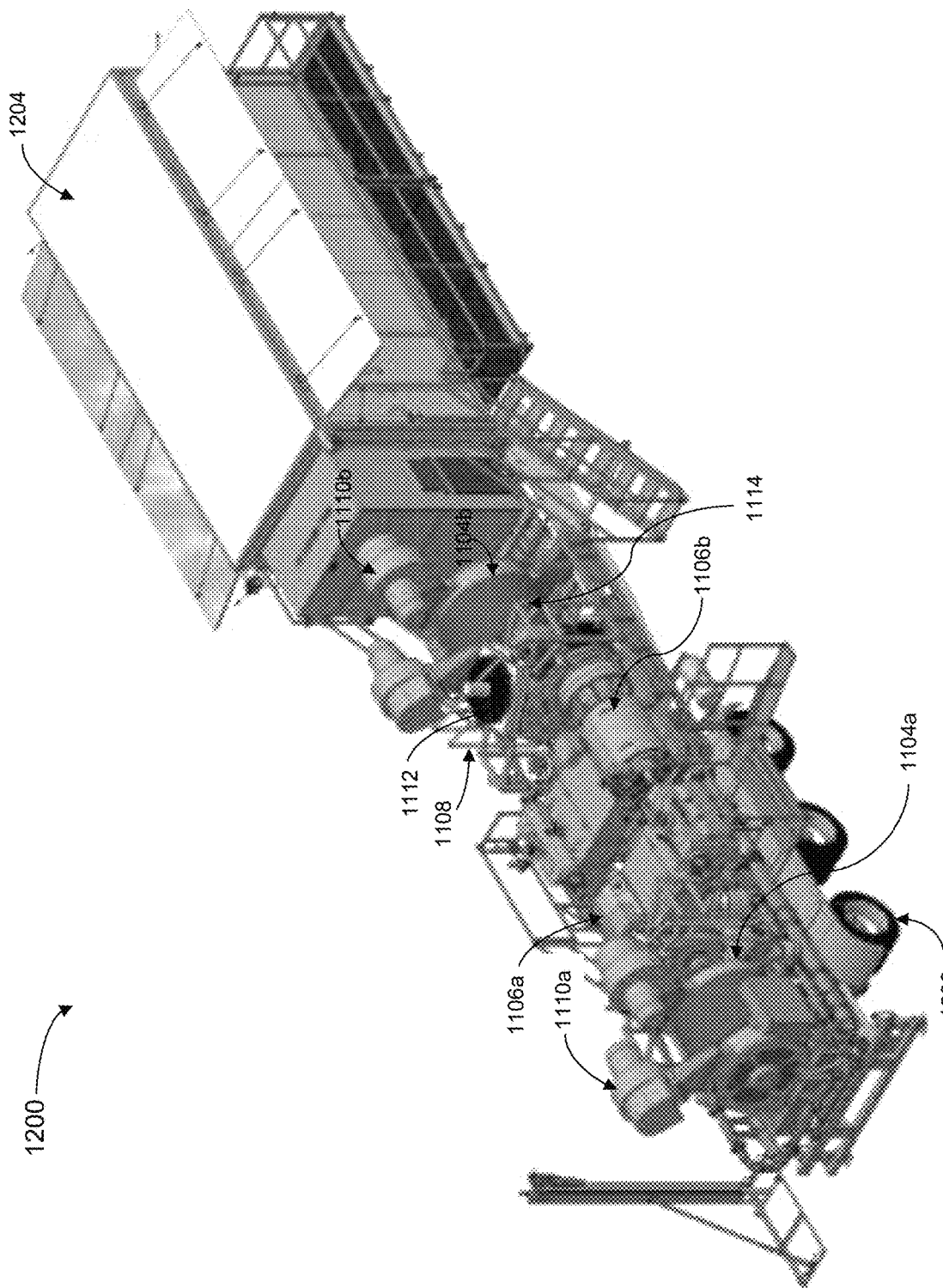
FIG. 12 is a perspective view of a second exemplary frame mounted unit in the form of a trailer for use with a hydraulic fracturing system that is configured for enhanced mobility, according to one or more aspects of the present disclosure.

Referring now to FIG. 12, a perspective view of a second exemplary frame mounted unit in the form of a trailer 1200 for use with hydraulic fracturing system 800 that is configured for enhanced mobility, according to one or more aspects of the present disclosure, is shown.

Trailer 1200 may be configured, in some aspects, to accommodate multiple instances of the various components comprised upon skid 1102, including, for example and not limitation, multiple electrically powered devices 1104 (shown as electrically powered devices 1104a-b in FIG. 12), and multiple pressure delivering devices 1106 (shown as pressure delivering devices 1106a-b in FIG. 12), multiple blowing devices 1110 (shown as blowing devices 1110a-b in FIG. 12). An appropriate number of other components may be included upon trailer 1200 as well, including, without limitation, at least one cooling radiator 1112 and accompanying radiator stand 1114, as well as at least one section of lubrication system piping 1108. Any and/or all components may be removably or permanently mounted on one or more skids 1102, which may in turn be removably mounted onto trailer 1200; or, in some aspects, any and/or all components may be removably or permanently mounted directly onto at least one portion of trailer 1200. Mounting may be accomplished by any appropriate means as may be apparent to those skilled in the relevant art(s) after reading the description herein, including, for example and not limitation, via one or more bolts, nuts, nails, washers, pins, clamps, clasps, welded bonds, adhesives, and the like. In some nonlimiting exemplary embodiments, one trailer 1200 may comprise two skids 1102 mounted thereon, including all of the components associated with skids 1102.

Trailer 1200 may include at least one wheeled axle 1202 (labeled only as wheeled axle 1202*a* in FIG. 12, for clarity) for mobility purposes. In some aspects, trailer 1200 may further comprise at least one drive house 1204 for securely at least partially containing at least one variable-frequency drive (VFD) (such as, for example and not limitation, the multi-pulse rectifier bridge drive system described above with reference to FIG. 9) that may be at least partially powered by power supply apparatus 900 and that may facilitate the operation of hydraulic fracturing system 800, such as, for example and not limitation, by controlling the flow rate at which fluid is pumped from pressure delivering device(s) 1106 to a wellbore and/or by controlling the motor speed and/or torque of the electrically powered device(s) 1106 with which the VFD(s) may be coupled and/or configured to engage in electrical communication with (via, by way of example and not limitation, one or more cables, in-line connectors, and/or any similar elements or components as may be apparent to those skilled in the relevant art(s) after reading the description herein) by varying the motor input frequency and voltage. By way of example and not limitation, in some additional aspects, each VFD may comprise a 3,000 HP to 4,000 HP AC VFD. By way of further example and not limitation, in some additional aspects each trailer 1200 may comprise a drive house 1204 that contains two VFDs.

Figure 13:
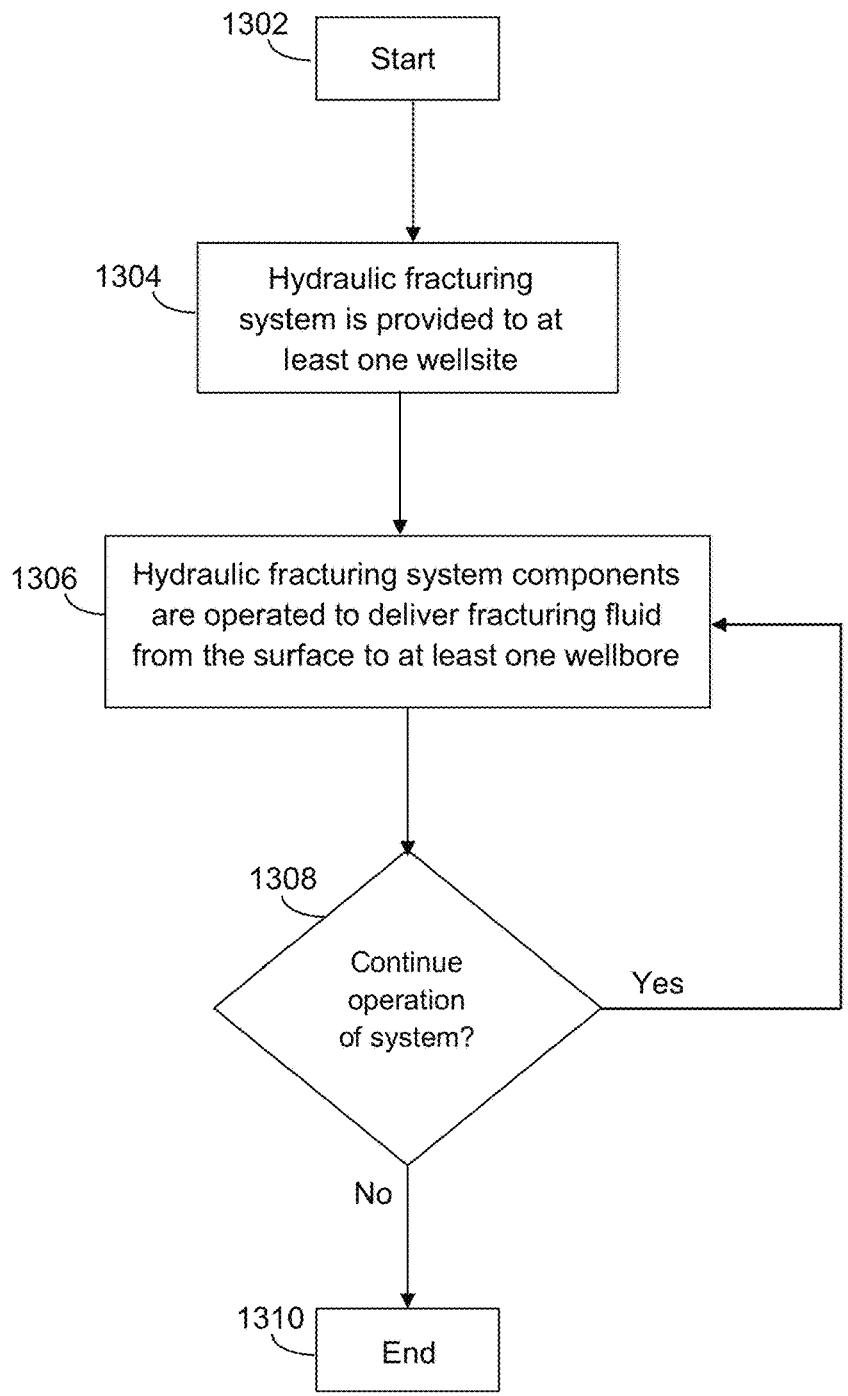
FIG. 13 is a flowchart illustrating an exemplary hydraulic fracturing process using a hydraulic fracturing system that is configured for enhanced mobility, according to one or more aspects of the present disclosure.

Referring now to FIG. 13, a flowchart illustrating an exemplary hydraulic fracturing process 1300 using a hydraulic fracturing system 800 that is configured for enhanced mobility, according to one or more aspects of the present disclosure, is shown.

Process 1300 may be implemented using hydraulic fracturing system 800 (not shown in FIG. 13) or any combination of one or more components of hydraulic fracturing system 800. Process 1300 may be used to deliver an amount of pressurized fracturing fluid to at least one wellbore.

Process 1300 begins at step 1302 and immediately proceeds to step 1304.

At step 1304, hydraulic fracturing system 800 is provided to at least one wellsite where at least one wellbore currently exists or will exist. Hydraulic fracturing system 800 may be conveyed via any appropriate means as may be apparent to those skilled in the relevant art(s) after reading the description herein, such as, by way of example and not limitation, via at least one mobile unit 816 (not shown in FIG. 13), such as, by way of further example and not limitation, a two or three axle tractor.

At step 1306, the various components of hydraulic fracturing system 800 are operated to deliver pressurized fracturing fluid from the surface to at least one wellbore. In some nonlimiting exemplary embodiments, turbine 902 (not shown in FIG. 13) may operate to engage power generating devices, such as generators 908 (not shown in FIG. 13) and 910 (not shown in FIG. 13) via a single shaft 906 (not shown in FIG. 13). The power generating devices may, in turn, generate AC and/or DC electricity that may be provided to at least one electrically powered device 1104 (not shown in FIG. 13), such as, by way of example and not limitation, an induction motor, via one or more cables, wires, and/or similar materials. Electrically powered device(s) 1104 may provide mechanical and/or electric power that may be used to drive at least one pressure delivering device 1106 (not shown in FIG. 13), such as, by way of example and not limitation, at least one pumping mechanism, via, by way of further example and not limitation, at least one mechanical coupling 1116 (e.g., belt(s), pulley assembl(ies), and/or gear coupling(s)) in order to pump pressurized fracturing fluid to the at least one wellbore.

At step 1308, it is determined whether to continue the operation of hydraulic fracturing system 800. Such determination may be made by one or more human users and/or by one or more computing devices communicatively coupled to hydraulic fracturing system 800, either wirelessly or via wired connectivity, either directly or via one or more networks (such as the global public Internet or a private intranet network or local area network). Typically, if more fracturing fluid needs to be delivered to the at least one wellbore, then process 1300 may be continued indefinitely until the pumping effects of process 1300 are no longer required and/or until timing and/or environmental conditions warrant the stoppage of process 1300. If it is determined that process 1300 should be repeated, then process 1300 proceeds back to step 1306 to continue the operation of hydraulic fracturing system 800. If it is determined that process 1300 should not be repeated, then process 1300 may proceed to step 1310.

At step 1310, process 1300 is terminated and process 1300 ends.

Figure 14:
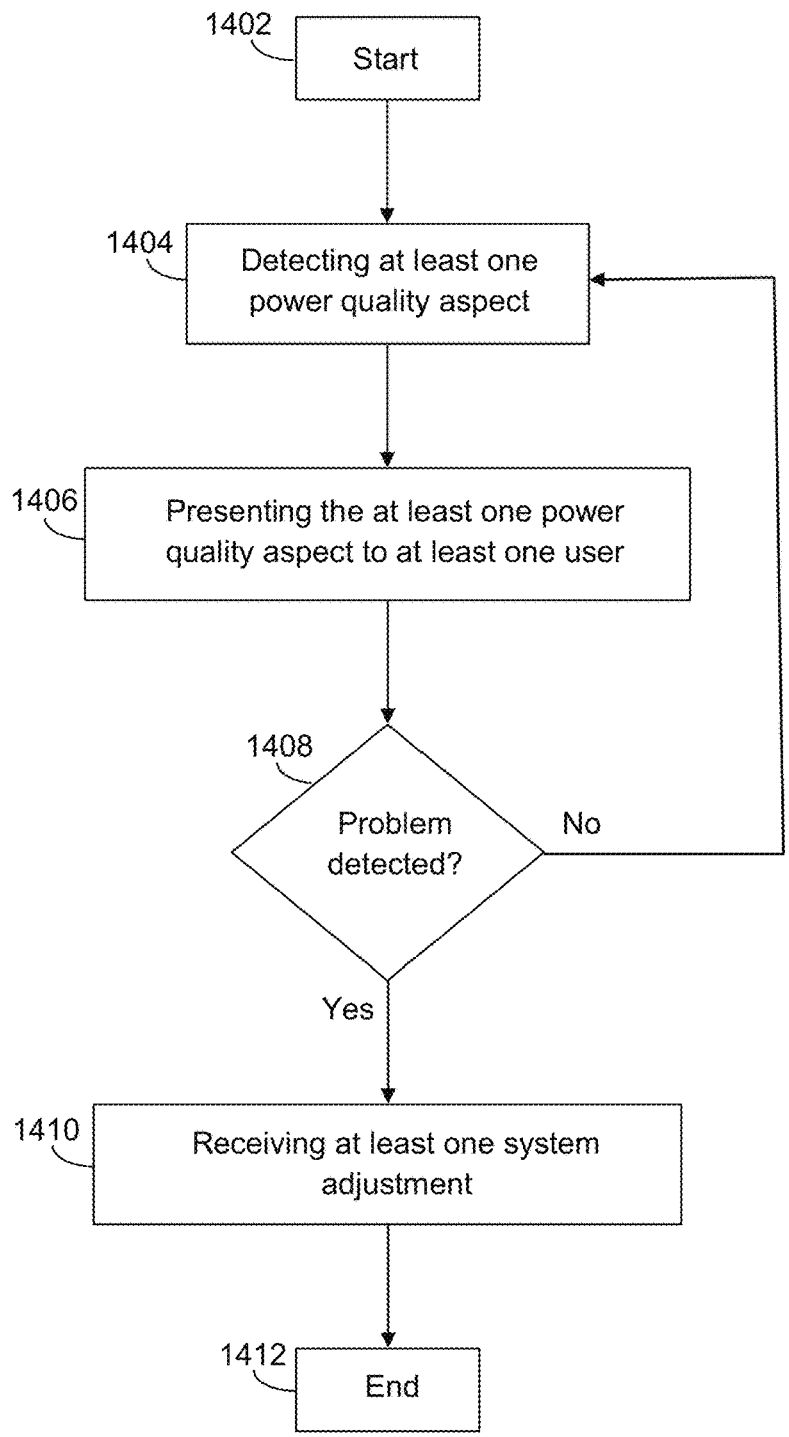
FIG. 14 is a flowchart illustrating an exemplary power quality monitoring process for use with a hydraulic fracturing system that is configured for enhanced mobility and that comprises at least one power generating device, according to one or more aspects of the present disclosure.

Referring now to FIG. 14, a flowchart illustrating an exemplary power quality monitoring process 1400 for use with hydraulic fracturing system 800 that is configured for enhanced mobility and that comprises at least one power generating device, according to one or more aspects of the present disclosure, is shown.

Process 1400 may be implemented using hydraulic fracturing system 800 (not shown in FIG. 14) or any combination of one or more components of hydraulic fracturing system 800, as long as the component(s) include at least one power generating device and at least one switchgear 814 (not shown in FIG. 14) or similar device.

Process 1400 begins at step 1402 and immediately proceeds to step 1404.

At step 1404, at least power quality aspect of at least one power generating device is detected. By way of example and not limitation, this detection may be performed by at least one sensing device within or upon at least one switchgear 814, or any similar device(s). By way of further example and not limitation, the at least one sensing device may comprise at least one of: a voltage transducer and an electric current transducer. By way of still further example and not limitation, the at least one power quality aspect may comprise a measurement of at least one of: a voltage, an electric current, and an electrical signal being output by at least one power generating device used within system 800, wherein such power generating device may include, in some nonlimiting exemplary embodiments, at least one generator, such as, by way of example and not limitation, a 0.6 megawatt 480 volt three phase generator operating at approximately 60 Hertz, a 2.05 megawatt 2100 volt three phase generator operating at approximately 270 Hertz, and/or a 4.1 megawatt 2100 volt three phase generator operating approximately 270 Hertz.

At step 1406, the at least one detected power quality aspect is presented to at least one user of system 800. By way of example and not limitation, the at least one power quality aspect may be presented upon at least one display screen, monitor, or one or more similar display devices as may be apparent to those skilled in the relevant art(s) after reading the description herein. In some aspects, each display device may be communicatively coupled to one or more computing devices, either wirelessly or via wired connectivity. In some additional nonlimiting exemplary embodiments, the one or more display devices may be communicatively coupled to one or more sensing device(s) configured within or upon each switchgear 814 (or similar device), either wirelessly or via wired connectivity, and/or the one or more display devices may be communicatively coupled to at least one portion of each switchgear 814 itself, either wirelessly or via wired connectivity. In some further aspects, the display device(s) and/or computing device(s) may be configured within or upon at least one control vehicle 812. In yet some further aspects, the power quality aspect measurement(s) from each power generating device of hydraulic fracturing system 800 may be obtained and displayed in substantially real time. The power quality aspect measurement(s) may be observed by one or more human users, or they may be monitored by one or more computing devices. In aspects wherein the power quality aspect measurement(s) may be monitored by one or more computing devices, step 1406 may be skipped.

At step 1408, it is determined whether there may be any problems with one or more power generating devices of hydraulic fracturing system 800. Such determination may be made by one or more human users and/or by one or more computing devices communicatively coupled to one or more switchgears 814 or similar devices and/or to one or more sensing devices within or upon an individual switchgear 814, such as, by way of example and not limitation, one or more voltage transducers and/or electric current transducers, wherein the communicative coupling may occur either wirelessly or via wired connectivity, either directly or via one or more networks (such as the global public Internet or a private intranet network or local area network). Unsatisfactory measurements regarding the voltage, electric current, and/or electric signal associated with one or more power generating devices may indicate the presence of electrical harmonics, a poor power factor, and/or voltage instability for one or more power generating devices, as well as any similar issues as may be apparent to those skilled in the relevant art(s) after reading the description herein. If it is determined that there is a problem with one or more power generating devices of hydraulic fracturing system 800, then process 1400 proceeds to step 1410. If it is determined that there are no problems with the power generating device(s) of hydraulic fracturing system 800, then process 1400 proceeds back to step 1404 to detecting more power quality aspect(s) of one or more power generating devices. In some aspects, power quality aspect detection may occur manually or automatically at set times or intervals, or power quality aspect detection may occur on a substantially continuous basis.

At step 1410, hydraulic fracturing system 800 receives at least one system adjustment. By way of example and not limitation, the at least one system adjustment may comprise the application of one or more filtering techniques, such as, for example, the addition of one or more capacitors. By way of further example and not limitation, the at least one system adjustment may comprise the redesigning of any problematic power generating devices and/or the adjustment of the operating speed of one or more power generating devices. The at least one system adjustment may be implemented by at least one human user; or, in some aspects, the at least one system adjustment may be implemented at least semi-autonomously by at least one computing device, such as, for example and not limitation, when the at least one system adjustment comprises changing the speed of one or more power generating devices.

At step 1412, process 1400 is terminated and process 1400 ends.

While process 1400 is described herein as being able to detect one or more problems with one or more power generating devices using one or more sensing devices configured within or upon one or more switchgears 814, it will be apparent to those skilled in the relevant art(s) after reading the description herein that one or more problems with one or more other components of hydraulic fracturing system 800, such as, for example and not limitation, turbine(s) 902 (not shown in FIG. 14) or electrically powered device(s) 1104 (not shown in FIG. 14) may also be detected by one or more sensing devices configured within or upon one or more other portions of hydraulic fracturing system 800, including one or more switchgears 814, without departing from the spirit and scope of the present disclosure.

Referring now to FIG. 15, a block diagram of an exemplary computer system useful for implementing one or more aspects of the present disclosure, is shown.

FIG. 15 sets forth an illustrative computer system that may be used to implement computing functionality 1500, which in all cases represents one or more physical and tangible processing mechanisms.

Computing functionality 1500 may comprise volatile and non-volatile memory, such as RAM 1502 and ROM 1504, as well as one or more processing devices 1506 (e.g., one or more central processing units (CPUs), one or more graphical processing units (GPUs), and the like). Computing functionality 1500 also optionally comprises various media devices 1508, such as a hard disk module, an optical disk module, and so forth. Computing functionality 1500 may perform various operations identified above when the processing device(s) 1506 execute(s) instructions that are maintained by memory (e.g., RAM 1502, ROM 1504, and the like).

More generally, instructions and other information may be stored on any computer readable medium 1510, including, but not limited to, static memory storage devices, magnetic storage devices, and optical storage devices. The term "computer readable medium" also encompasses plural storage devices. In all cases, computer readable medium 1510 represents some form of physical and tangible entity. By way of example and not limitation, computer readable medium 1510 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1502, ROM 1504, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of computer readable medium.

Computing functionality 1500 may also comprise an input/output module 1512 for receiving various inputs (via input modules 1514), and for providing various outputs (via one or more output modules). One particular output module mechanism may be a presentation module 1516 and an associated GUI 1518. Computing functionality 1500 may also include one or more network interfaces 1520 for exchanging data with other devices via one or more communication conduits 1522. In some aspects, one or more communication buses 1524 communicatively couple the above-described components together.

Communication conduit(s) 1522 may be implemented in any manner (e.g., by a local area network, a wide area network (e.g., the Internet), and the like, or any combination thereof). Communication conduit(s) 1522 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "service," "module," and "component" as used herein generally represent software, firmware, hardware, or any combination thereof. In the case of a software implementation, the service, module, or component represents program code that performs specified tasks when executed on one or more processors. The program code may be stored in one or more computer readable memory devices, as described with reference to FIG. 15. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming consoled, and the like).

While the hydraulic fracturing system embodiments described herein may be described generally for production from oil and gas wells, hydraulic fracturing systems in accordance with the present disclosure may be utilized in one or more various other applications, including:

to stimulate groundwater wells;

to precondition or induce rock to cave in mining;

as a means of enhancing waste remediation processes, usually hydrocarbon waste or spills;

to dispose of waste by injection into deep rock formations;

as a method to measure the stress in the Earth;

for heat extraction to produce electricity in enhanced geothermal systems; and to increase injection rates for geologic sequestration of $CO_2$, as well as any similar application(s) as may be apparent to those skilled in the relevant art(s) after reading the description herein.

The ability to transfer the equipment of the present disclosure directly on a truck body or to a trailer increases efficiency and lowers cost. In addition, by eliminating or reducing the number of trailers that carry the equipment, the equipment may be delivered to sites having a restricted amount of space, and may be carried to and away from worksites with less damage to the surrounding environment.

The use of the technology as disclosed may be as follows: The water, sand, and other components may be blended to form a fracturing fluid, which fluid may be pumped down a well by the system as described. Typically, the well is designed so that the fracturing fluid may exit the wellbore at a desired location and pass into the surrounding formation. For example, in some aspects, the wellbore may have perforations that allow the fluid to pass from the wellbore into the formation. In other embodiments, the wellbore may include an openable sleeve, or the well may itself be an open hole. The fracturing fluid may be pumped into the wellbore at a high enough pressure that the fracturing fluid cracks the formation, and enters into the cracks. Once inside the cracks, the sand, or other proppants in the mixture, wedges in the cracks and holds the cracks open.

Using the pump controls and data monitoring equipment as disclosed herein, one or more operators may monitor, gauge and manipulate parameters of operation, such as pressures and volumes of fluids and proppants entering and exiting the well. For example, an operator may increase or decrease the ratio of sand and water as fracturing progresses and circumstances change.

In some aspects, the hydraulic fracturing systems of the present disclosure may also be used for offshore sites. Use of the hydraulic fracturing systems of the present disclosure may be more efficient than using diesel powered pumps. Fracturing systems as disclosed may be smaller and lighter than the equipment typically used on the deck of offshore vessels, thus removing some of the current ballast issues and allowing more equipment or raw materials to be transported by the offshore vessels.

In a deck layout for a conventional offshore stimulation vessel, skid based diesel powered pumping equipment and storage facilities on the deck of the vessel create ballast issues. Too much heavy equipment on the deck of the vessel causes the vessel to have a higher center of gravity. In some aspects, with regard to the hydraulic fracturing systems of the present disclosure, the physical footprint of the equipment layout may be reduced significantly when compared to a conventional layout. More free space may be available on deck, and the weight of the equipment may be dramatically decreased, thus minimizing ballast issues.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality, and advantages of the present disclosure, are presented for example purposes only. The present disclosure is sufficiently flexible and configurable, such that it may be implemented in ways other than that shown in the accompanying figures (e.g., utilization with different pressure delivery applications; utilization with different systems, methods, processes, apparatuses, devices, and components other than those mentioned herein). As will be appreciated by those skilled in the relevant art(s) after reading the description herein, certain features from different aspects of the systems and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A fracturing system for use at a fracturing site, the fracturing system comprising:
   at least one mobile unit comprising:
   at least one frame mounted unit, the at least one frame mounted unit comprising:
   one or more pressure delivering devices;
   one or more electrically powered devices, the one or more electrically powered devices being coupled to the pressure delivering devices via at least one mechanical coupling;
   one or more variable-frequency drives (VFD), the one or more variable-frequency drives being in electrical communication with the one or more electrically powered devices; and
   a power source coupled to the electrically powered devices and VFD, wherein the one or more electrically power devices are adapt to be added or removed from the fracturing site without modification of the VFD,
   wherein the one or more pressure delivering devices are configured to deliver slurry to at least one wellbore.

2. The fracturing system of claim 1, wherein each of the one or more pressure delivering devices is capable of supplying at least 3,500 horsepower.

3. The fracturing system of claim 1, wherein each of the one or more electrically powered devices is capable of supplying at least 2,000 horsepower.

4. The fracturing system of claim 1, wherein the combined weight of a single mobile unit and frame mounted unit is less than 127,600 pounds.

5. The fracturing system of claim 1, wherein the one or more electrically powered devices are mounted on the one or more pressure delivering devices.

6. The fracturing system of claim 1, wherein each of the one or more pressure delivering devices comprises a quintuplex plunger-style fluid pump.

7. The fracturing system of claim 1, wherein each of the one or more pressure delivering devices comprises a triplex plunger-style fluid pump.

8. The fracturing system of claim 1, wherein the at least one frame mounted unit includes two pressure delivering devices and each pressure delivering device is coupled to two electrically powered devices.

9. The fracturing system of claim 8, wherein the at least one frame mounted unit includes two 3,000 horsepower quintuplex plunger-style fluid pumps, two AC induction motors mounted on each fluid pump capable of supplying at least 1,600 horsepower, two 4,000 horsepower AC VFDs, a VFD cooling system, and an auxiliary power source, wherein said auxiliary power source powers auxiliary equipment, lube pumps, and cooling fans, and wherein the induction motors and fluid pumps are coupled via pulley assemblies.

10. The fracturing system of claim 1, wherein the at least one frame mounted unit includes one pressure delivering device coupled to one electrically powered device.

11. The fracturing system of claim 10, wherein the at least one frame mounted unit includes one 3,500 horsepower quintuplex plunger-style fluid pump, an AC induction motor capable of supplying at least 2,000 horsepower, a 4,000 horsepower AC VFD, and an auxiliary power source, wherein the auxiliary power source powers auxiliary equipment, lube pumps, and cooling fans, and wherein the induction motor and fluid pump are coupled via transmission.

12. The fracturing system of claim 1, wherein the functionality of the one or more electrically powered devices is diagnosed via a separate operator interface terminal.

13. The fracturing system of claim 1, wherein the pressure delivering devices and electrically powered devices are horizontally configured.

14. The fracturing system of claim 1, wherein the system is configured to be disposed at one or more on shore locations and one or more offshore locations.

* * * * *